(12) United States Patent
Miller, II et al.

(10) Patent No.: US 10,547,393 B2
(45) Date of Patent: Jan. 28, 2020

(54) GUIDED DISTRIBUTED INTERFERENCE MANAGEMENT SYSTEM UTILIZING POSITIVE CO-CHANNEL INTERFERENCE DETECTION, MEASUREMENT AND MITIGATION EMPLOYING A COMMUNICATION NETWORK OR AN INTERNET CONNECTION

(71) Applicant: incNetworks, Inc., Somerset, NJ (US)

(72) Inventors: Robert R. Miller, II, Convent Station, NJ (US); Jesse E. Russell, Piscataway, NJ (US)

(73) Assignee: incNetworks, Inc., Somerset, NJ (US)

(*) Notice: Subject to any disclaimer, the term of this patent is extended or adjusted under 35 U.S.C. 154(b) by 29 days.

(21) Appl. No.: 16/012,705

(22) Filed: Jun. 19, 2018

(65) Prior Publication Data

US 2018/0302173 A1 Oct. 18, 2018

Related U.S. Application Data

(63) Continuation of application No. 15/284,427, filed on Oct. 3, 2016, now Pat. No. 10,003,412.

(Continued)

(51) Int. Cl.
*H04B 15/00* (2006.01)
*H04B 17/345* (2015.01)
(Continued)

(52) U.S. Cl.
CPC ............ *H04B 15/00* (2013.01); *H04B 17/26* (2015.01); *H04B 17/345* (2015.01);
(Continued)

(58) Field of Classification Search
None
See application file for complete search history.

(56) References Cited

U.S. PATENT DOCUMENTS 9,749,114 B2 * 8/2017 Abdelmonem ....... H04L 5/0026
10,003,412 B2 6/2018 Miller, II
(Continued)

*Primary Examiner* — Jutai Kao
(74) *Attorney, Agent, or Firm* — Doster Greene, LLC

(57) ABSTRACT

Various embodiments of the system and method relate to improvements in co-channel interference mitigation in shared spectrum environments operating under the aegis of a Spectrum Access System and companion database. Implementation orchestrates, detects, and obtains noise measurements from a potentially-affected receiver utilizing programmed reduction of transmitted power from a potential interferer when the two entities connect over the Internet or other communication network. Receivers and transmitters may use the method with the same or different Physical Layers (PHYs) and protocols. In one embodiment, a momentary reduction of transmitter power is noted during which putative interference is measured at the receiver. In another embodiment, an isolated burst is sent from a not-yet commissioned transmitter to contemporaneously detect possible interference at an operating receiver. A third embodiment can be used to measure and mitigate interference from a stationary mobile transmitter. A fourth embodiment establishes hosting for potential interference recognition as a service.

5 Claims, 15 Drawing Sheets

Related U.S. Application Data

(60) Provisional application No. 62/235,865, filed on Oct. 1, 2015.

(51) Int. Cl.
  *H04W 52/24* (2009.01)
  *H04W 24/08* (2009.01)
  *H04W 24/02* (2009.01)
  *H04B 17/26* (2015.01)
  *H04W 16/14* (2009.01)

(52) U.S. Cl.
  CPC .......... *H04W 24/02* (2013.01); *H04W 24/08* (2013.01); *H04W 52/245* (2013.01); *H04B 2215/00* (2013.01); *H04W 16/14* (2013.01); *H04W 52/244* (2013.01); *H04W 52/247* (2013.01)

(56) References Cited

U.S. PATENT DOCUMENTS

| | | | | |
|---|---|---|---|---|
| 2014/0328309 | A1* | 11/2014 | Comstock | H04W 72/082 |
| | | | | 370/329 |
| 2015/0131631 | A1* | 5/2015 | Chen | H04W 24/02 |
| | | | | 370/336 |
| 2015/0189664 | A1* | 7/2015 | Hu | H04W 72/082 |
| | | | | 370/329 |
| 2016/0302196 | A1 | 10/2016 | Chen | |
| 2017/0311332 | A1 | 10/2017 | Hong | |

* cited by examiner

GUIDED DISTRIBUTED INTERFERENCE MANAGEMENT SYSTEM UTILIZING POSITIVE CO-CHANNEL INTERFERENCE DETECTION, MEASUREMENT AND MITIGATION EMPLOYING A COMMUNICATION NETWORK OR AN INTERNET CONNECTION

RELATED APPLICATIONS

This application is a continuation of U.S. patent application Ser. No. 15/284,427, filed on Oct. 3, 2016, which will issue as U.S. Pat. No. 10,003,412 on Jun. 19, 2018, which claims benefit of U.S. Provisional Patent Application Ser. No. 62/235,865, filed on Oct. 1, 2015. The subject matter of the earlier filed application is hereby incorporated by reference.

BACKGROUND OF THE INVENTION

Field of the Invention

The present teachings relate to manual, centralized, and distributed Spectrum Access Systems (SASs) and/or Spectrum Coordinating Clearinghouse Processes (SCCPs) and methods for providing RF emission and interference management. The systems and methods discussed herein are capable of identifying, isolating and measuring the presence of co-channel interference and managing such interference to improve spectrum utility of users, such as incumbents, carriers, and individuals.

Description of the Prior Art

Currently, interference management entails significant cost, effort, and time to detect and resolve sources of RF that can harm other services using a radio channel. Interference can cause quality of service reductions resulting in customer service dissatisfaction and customer complaints, in part due to the time required to isolate and resolve interference situations. Currently, interference management entails significant manual labor, cost, effort, and time to detect and resolve sources of RF that can harm other services using a radio channel. Accordingly, a need exists for a system that utilizes guided means of policy management, analytics, and machine learning to facilitate the process of automatically detecting, isolating, measuring and mitigating co-channel interference within wireless communications systems that share the same or a common spectrum band.

The widespread use of smartphones, laptops, and tablets has dramatically increased the demand for more access to spectrum due to the increase in bandwidth demanded by users of these devices as well as the increased growth of machine-to-machine communications. Eventually, as users and machines exploit more of the limited spectrum resource it becomes more congested due to a continuous build-up of interference levels. As a result, more attention must be paid to spectrum interference management and more effort and resources must be applied to detect and resolve the increase in sources of mutual interference. The challenge of the interference build-up due to co-channel coupling becomes even more acute as spectrum sharing wireless communication systems evolve.

As the foundation of all wireless systems, the spectrum is a very valuable and limited resource. In order to improve the utilization efficiency of spectrum and provide interference protection for services, shared spectrum use must increase. Using the shared spectrum concept, multiple licensees may operate in the same spectrum simultaneously, increasing the risk of co-channel interference.

One of the key challenges facing today's shared spectrum environment is that, increasingly when one service uses an available portion of the spectrum, it may be no longer available for other services or systems without causing harmful interference and interference must be continually managed to keep the spectrum productive.

The goal of interference management and mitigation systems is to maximize the amount of non-harmful communication that can occur among many users/services occupying the spectrum resource among differing spatial areas as we move toward more intensive spectrum sharing. More orderly operation of shared spectrum services necessitates the need for improved methods and techniques of spectrum interference management and mitigation, such as a guided and programmable Distributed Spectrum Interference Management System (DSIMS) with a built-in capability to automate the spectrum interference management and mitigation process. Such a process may be achieved through the use of a distributed spectrum coordinating clearinghouse employing advanced policy management rules, analytics, and machine learning algorithms to automatically detect, isolate, measure and mitigate co-channel interference.

To address interference congestion in the U.S., the government works to minimize the sources of interference through spectrum regulations (domestic and international), interference detection and mitigation efforts, and enforcement. The Federal Communications Commission (FCC) is the United States Government Agency responsible for dividing the spectrum amongst competing industries and agencies. However, the FCC would like to encourage the optimum use of the available spectrum resource by fostering new approaches to spectrum utilization such as spectrum sharing amongst existing and future spectrum owners.

An example of this new approach fostered by the FCC is the shared use of spectrum amongst disparate uses and entities within a newly allocated 3.5 GHz spectrum band. This new spectrum sharing approach by the FCC will require the implementation of new approaches to SASs and/or SCCP systems to address the FCC's recently adopted rules for their new shared spectrum approach. This new FCC spectrum sharing approach is designed to allow the management of access to this newly allocated 3.5 GHz spectrum band across several tiers of users: incumbents, carriers, and consumers as well as encourage existing spectrum owners to use similar spectrum sharing approaches. The first tier consists of incumbent federal users that are entitled to full protection for their operations and would have protection from harmful interference from all other users in the 3.5 GHz band. The second tier consists of Priority Access Licenses (PAL) users, receive protection from third tier uses, but are required to avoid interference with, and accept interference from, the first tier users. The third tier consists of General Authorized Access (GAA) users who are entitled to use the spectrum on an opportunistic basis and are not entitled to interference protection. Thus, according to the priority scheme, the third tier users are required to not cause interference to, and must accept interference from the first tier and second tier users. The PAL operations receive interference protection from GAA operations. The GAA users receive no interference protection from other users.

In this example, coordination of the shared use of this spectrum among the different tiers can be advantageously applied using the aforementioned guided Distributed Spectrum Interference Management System (DSIMS). Its use in this case protects higher tier users from lower tier users and optimizes frequency use to allow maximum capacity and coexistence among the users within new spectrum bands, existing spectrum bands or both.

Despite improvements in wireless technology, the management of interference in the wireless industry remains a major challenge. As the FCC seeks to allocate additional spectrum to provide higher data bandwidths with higher quality of wireless services as well as support more wireless machine-to-machine communications, the challenges of interference management in shared spectrum bands will be intensified. Band expansions such as the newly allocated shared 3.5 GHz spectrum band are a case in point. To meet the increasing demand for more spectrum utility supporting richer applications such as wireless video communication and more diverse smart wireless sensor/control machine interactivity, such as office building energy management and control systems, building automation systems and office air and water environmental sensing and control systems.

The challenges of interference management increase significantly due to frequency reuse within a shared spectrum band. The probability of interference grows with system and user density in an area, and so the probability of harmful interference also increases. Interference management can also be more problematic as users access new and existing services allocated within the same spectrum band. These new and existing services when operating with differing bandwidths, emission types, formats, and power levels, can also increase the complexity of interference management.

Because the frequencies used by disparate systems and networks are shared, a wireless device can experience interference from many sources. However, one of the most common causes of interference is co-channel interference. Co-channel interference is created when devices transmit simultaneously during the process of communicating using the same overlaid frequency channels.

Although some access protocols may defer transmission until the channel is clear, other protocols cannot support the function of listening for a clear channel before transmitting. Interference that occurs during simultaneous transmission may cause loss of communication channel integrity and require data retransmission. These retransmissions slow throughput and result in wildly fluctuating performance for all users sharing the same spectrum resource. Where real-time communication is required, significant portions of the content may be rendered useless.

Historically, to combat interference, attempts were made to identify and isolate an interference source. In searching out sources of interferences, traditional approaches include radiolocation, reception of an ID or call-sign, intuition, and/or mobile measurements. In many cases, locating the source of the interference can be difficult, expensive, and time consuming. Oftentimes, interference incidents are voluntarily resolved by the involved parties. For example, if the suspected interfering transmitter can be located, the interfering source may then be contacted, by telephone or in person, to request that the engineering organization at the interfering station turn off the identified transmitter to determine whether or not the observed interference ceases. If the interference target source is verified, measures can then be taken to develop approaches for minimizing the interference. However, the isolation and verification of an interfering transmitter can take a significant amount of time and effort before resolution of the source of the interference can start. It is important to note that during this isolation and verification process system performance and/or quality for the users may be jeopardized.

In addition, new communications systems, which will be utilized in the implementation of new spectrum sharing environments, may also add complication to the process of interference mitigation. The use of differing physical layers ("PHYs"), protocols, and information content may make identification of the source of interferers even more difficult. Moreover, such emissions may involve data or other transmissions not easily identifiable as a call-sign or by other conventional techniques of determining the source of interference (e.g. distributed Multiple-In Multiple-Out (MIMO) transmission). These properties, as well as others, demand more effective and rapid methods and processes of mutual interference control which will require new approaches and systems for the identification, detection, mitigation and management of sources of mutual interference.

Fortunately, radio operations today differ from earlier services. With the advent of the Internet, systems now routinely connect to the Internet or other wired or wireless national or regional secure communications infrastructure. Current systems also operate using computer-control, in real-time, with accurate clocks having time-of-day capability. Furthermore, the names or identifications of such systems may be compiled in secure database listings, which are accessible by other systems along with properties of operation (e.g., geo-location, frequency, channel bandwidth, power, antenna characteristics, PHY, intelligence content, etc.).

Thus, it may be desirable to provide a system that is capable of operating as an SAS administrator. It may also be desirable to provide a system that is capable of performing the SAS functions enumerated by the spectrum sharing FCC guidelines. Because these shared spectrum schemes depend on a high degree of interaction, it may also be desirable to provide an SAS which ensures that the lower tiers do not transgress onto the rights of higher tiers, thereby causing degradation in the quality of services of the higher tiers due to interference caused by the lower tiers.

Further, it may be desirable to provide a system with spectrum sharing capabilities that utilize techniques to avoid interference between and amongst users. In the event of harmful interference, it may be desirable to have a system that easily identifies the sources of interference and quickly correct the cause of interference. For example, it may be desirable for a system that implements a method to identify and take corrective action for suspected interfering transmitters even when the exact location and identity of the interference-causing transmitters is not known. Furthermore, it may be desirable for an SAS and/or SCCP that is designed to automatically detect, identify, classify, locate and record/archive sources of harmful interference, with no need for human interaction. These attributes can be addressed by a new type of guided automated system and approach that can perform the identification, detection, mitigation and management of sources of mutual interference, such as a guided Distributed Spectrum Interference Management Systems (DSIMS) with distributed spectrum coordinating clearinghouse processes.

SUMMARY OF THE INVENTION

The present invention may satisfy one or more of the above-mentioned desirable features. Other features and/or aspects may become apparent from the description which follows.

According to various embodiments, a guided Distributed Spectrum Interference Management System (DSIMS) can employ a networked, distributed spectrum-coordinating clearinghouse process as illustrated in the exemplary architectural diagram depicted in FIG. 1. The system leverages new capabilities to automate and speed the process of identifying, measuring, and coordinating emissions from a wireless system or transmitter that may be causing interference to a co-channel wireless system or receiver. The DSIMS system utilizes policy management rules, big data analytics, and machine learning to automatically isolate, measure, report, suggest, and optionally adjust the level of co-channel interference sources operating in a shared spectrum environment.

In various embodiments, the DSIMS system determines whether signal levels received by a "victim" receiver that is part of a wireless communication system are high enough to be termed "interference". Such interference may be termed "meaningful" or "harmful" if it disrupts the victim's communication resource. The system accomplishes the determination by monitoring the disappearance or reduction ("dimming") of the offending signal during a "Blank Burst". The Blank Burst is arranged by the potentially-interfering transmitter to occur at a mutually-agreed-to time of day known only by the "victim" receiver and the putative "interferer" or "interference initiator". In various embodiments, the operation is orchestrated by a Blank Burst Coordinator issued over the Internet or other secure communication networks directed to the address of the victim system via a secure communications connection containing the properties of the Blank Burst. These properties may include, but are not limited to, information items such as Transmitter ID Designator, Frequency Channel Designator, Requested Burst Time (M-D-Y H:M:S), Burst Duration, Burst Power Reduction (dB), Number of Repeats, and Repeat Interval (if any). This process may require that the transmitter emissions either be reduced to a lower level or shut off entirely for the duration of the burst to aid in the identification and measurement of the source of the potentially-interfering transmitter's signal at a victim receiver. Reduction of the emission level rather than completely eliminating it can lessen the disruption to users of the system's regular service. In addition, it can also be used to verify the relationship between a transmitter's RF power change and the victim receiver's signal strength indication. The Blank Burst technique may be used with arbitrary analog or digital transmission formats and analog or digital receivers, as the procedure involves only RF power-setting or RF envelope detection of the signals augmented by computer-assisted control and measurement.

In various embodiments, when the "interference victim" receiver's Blank Burst Coordinator receives the Blank Burst scheduling confirmation from the "interference initiator" containing the potential "interference initiator" transmitter information, the "interference victim" receiver's Blank Burst Coordinator schedules the exact future time that it should expect to receive a burst from the potential "interference initiator" transmitter. The exact time of the potential "interference initiator" transmitter's Blank Burst scheduling confirmation may be adjusted by the initiator, for example, to fit the super-frame protocol or duplex timing of the system's Physical Transmission Layer "PHY" format. The victim's Blank Burst Coordinator prepares the "victim" system's policy management controller so as to ensure the receiver is ready to intercept the burst at the agreed-to time between the victim Blank Burst Coordinator and the potential "interference initiator" transmitter's Blank Burst Coordinator.

In various embodiments, the system controller at the "interference victim" receiver's Blank Burst Coordinator sets the system's receiver as appropriate for the parameters of the Blank Burst. At the agreed-to time, the transmitter at the potential "interference initiator" Blank Burst Coordinator executes the Blank Burst which is received at the "interference victim" receiver's Blank Burst Coordinator. The receiver logs the signal strength at its antenna, recording the pre-burst, burst, and post-burst signal indications and stores them for later processing and analysis. The signal indication received from the potential "interference initiator" transmitter may fall to a lower signal level during the Blank Burst interval. If so, the difference between the pre- and post-signal level and the signal level during the Blank Burst interval is an indication that the transmitter of the potential "interference initiator" transmitter may be contributing sufficient interference to affect operation of the "interference victim" receiver and system.

Using the DSIMS database system and/or other databases, in various embodiments, a topographic and obstruction mapping database and a suitable propagation model and gain calculation, the "interference victim" receiver can repeatedly request a Blank Burst from each transmitter disclosed by the model as being potentially "in range" to determine the level of signal from each. Using this process, the victim can automatically determine if one or more transmitters are contributing interference to the "interference victim" receiver. Following the determination, remediation can be undertaken to reduce or eliminate the interference to the "interference victim" receiver. The remediation can extend to optional automated power reduction of an offending transmitter if permitted by the DSIMS rule base. If multiple transmitters may be interfering, the technique can be used to sequentially poll them to determine which, if any, are causing interference. The sequential polling process allows the DSIMS/Blank Burst system to continuously monitor the levels of co-channel interference within a closed set and/or groups of local public or private spectrum-sharing wireless communication systems and to activate the DSIMS system capabilities to atomically mitigate or eliminate the sources of co-channel interference within a particular group of these local public or private spectrum-sharing wireless communication systems.

In the following description, certain aspects and embodiments will become evident. It should be understood that the invention, in its broadest sense, could be practiced without having one or more features of these aspects and embodiments. It should also be understood that these aspects are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

DETAIL DESCRIPTION OF THE EMBODIMENT(S)

This detailed description will reference various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about" or "approximately." Accordingly, unless indicated to the contrary, the numerical parameters set forth in the following specification and attached claims are approximations that may vary depending upon the desired properties sought to be obtained. In some instances, "about" or "approximately" can be understood to mean a given value ±5%. Therefore, for example, about 100 degrees Fahrenheit could mean 95-105 degrees Fahrenheit.

As a summary overview, shared spectrum approaches will require the use of a new and more advanced, automated and distributed type of spectrum interference management system to allow cooperation and maximize use of the wireless resource. This DSIMS system approach can function as a clearinghouse for license management as well as maintain descriptive properties that characterize the transmitter, receiver, and antenna operations used by each of the services with companion interference information. Further, the main DSIMS system may be supplemented by other distributed, cloud-based systems and communications networks. The DSIMS and Distributed Spectrum Coordinating Clearinghouse Processes utilize associated communication networks containing databases that maintain details about devices in each service/system. These databases can be used to facilitate communication between services/systems for the purpose of identifying transmitter emissions that could pose potential interference to receivers within the service areas of these services/systems.

Figure 1:
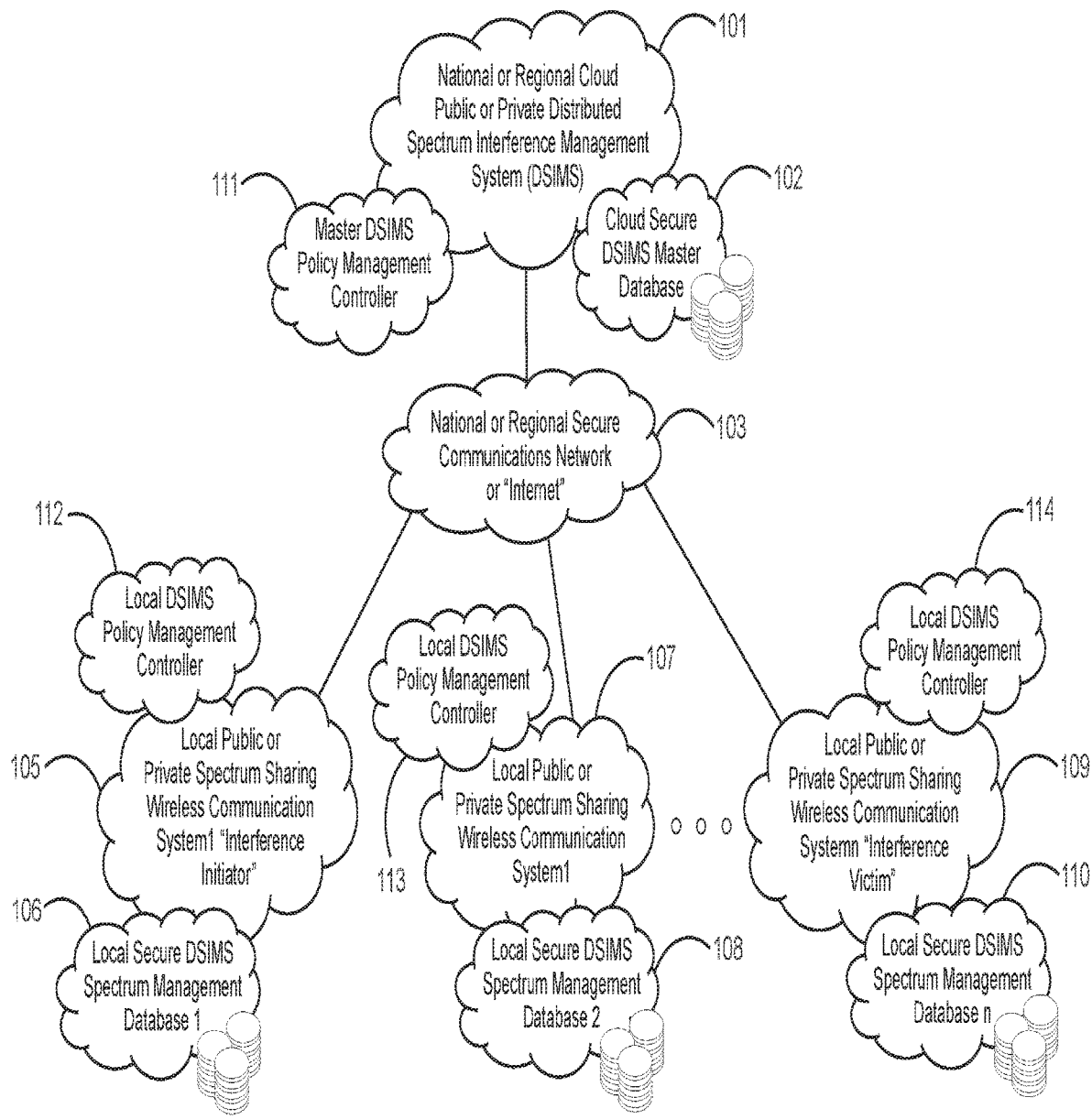
FIG. 1 depicts an exemplary system architecture of a Guided Distributed Spectrum Interference Management System (DSIMS) with policy management capabilities that utilizes the Blank Burst and Reverse Blank Burst Methods to performance interference detection and mitigation based on policy management rules, big data analytics, and machine learning.
Figure 2:
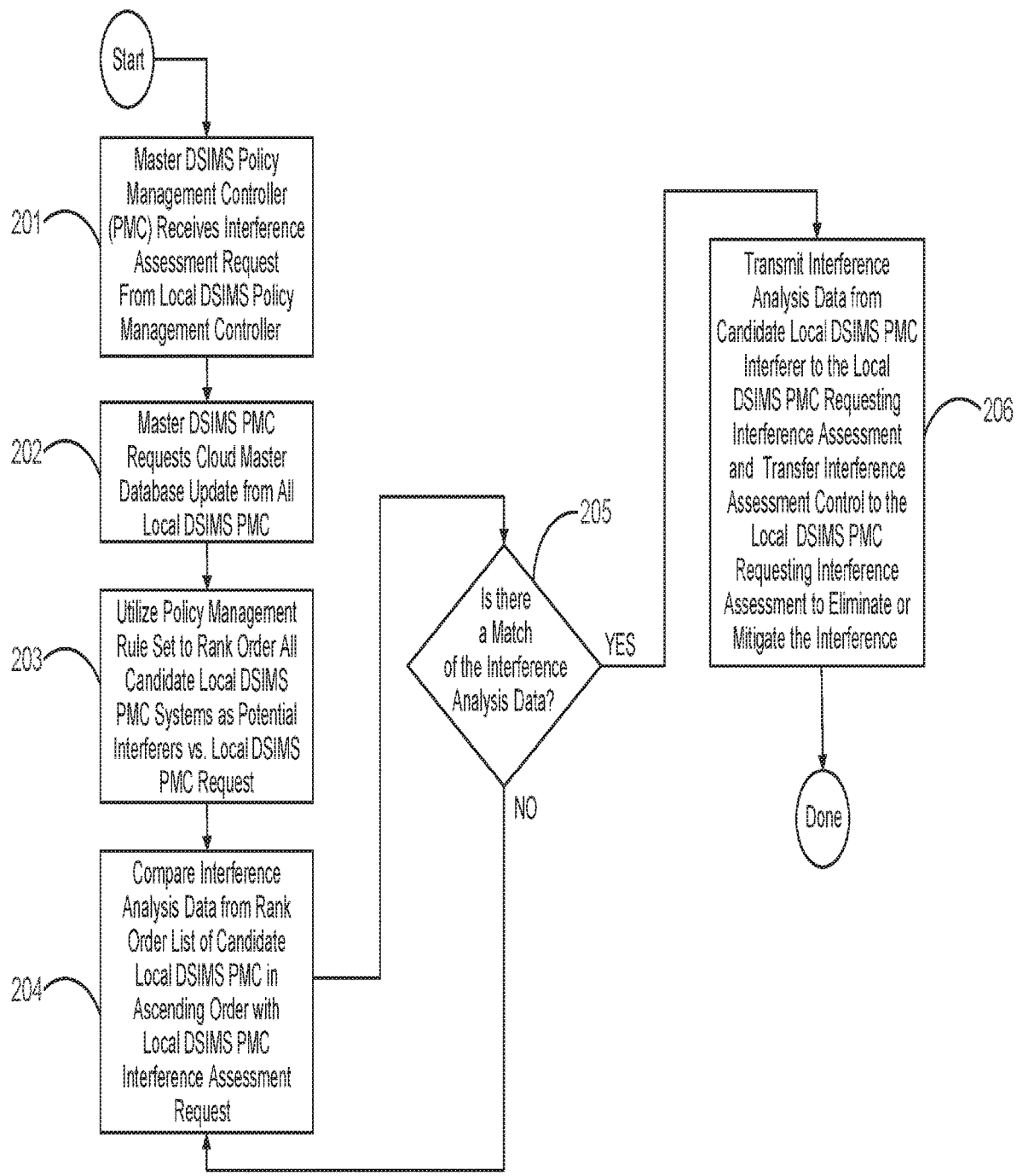
FIG. 2 depicts an exemplary scenario of a DSIMS policy management process flow to allow local public or private spectrum sharing systems to leverage Blank Burst and Reverse Blank Burst methods to detect and mitigation interference amongst spectrum sharing systems.

The architecture of the DSIMS system with its Distributed Spectrum Coordinating Clearinghouse Process is illustrated in the architectural diagram of FIG. 1 and process flow of FIG. 2. It consists of a National or Regional Distributed Spectrum Interference Management System with a rule based programmable Master Policy Management Controller (MPMC) having the capability to perform big data analytics on data collected and stored in databases from connected local spectrum-sharing wireless communication systems which may experience radio frequency coupling. The MPMC orchestrates the communications and interactions between groups of local spectrum-sharing wireless communication systems that are connected to the National or Regional communications network or the "Internet". In addition, the National or Regional DSIMS system consists of a master database for warehousing data from many local spectrum sharing wireless communication systems which are interconnected by the same national or regional communications network or the "Internet" for the purpose of utilizing the "Blank Burst" and "Reverse Blank Burst" methods as well as related processes to automate interference management and mitigation via a guided DSIMS process.

The automated DSIMS Policy Management process is illustrated in FIG. 2. It utilizes the Blank Burst and Reverse Blank Burst Interference mitigation methodology for managing and minimizing potential co-channel interference within spectrum sharing wireless communications systems that are interconnected intentionally or unintentionally via radio frequency coupling. The National or Regional Master Policy Management Controller (MPMC) utilizes a rule base for collecting, storing and organizing data from local policy management controllers and local DSIMS spectrum management databases for the purpose of performing big data analytics to identify potential system interfering sources. The MPMC utilizes the result of the analysis to guide these local spectrum sharing wireless communications systems through a process to mitigate co-channel interference amongst themselves, thereby enabling these coupled spectrum sharing wireless communications systems to better coexist within the same spectrum band.

Figure 3:
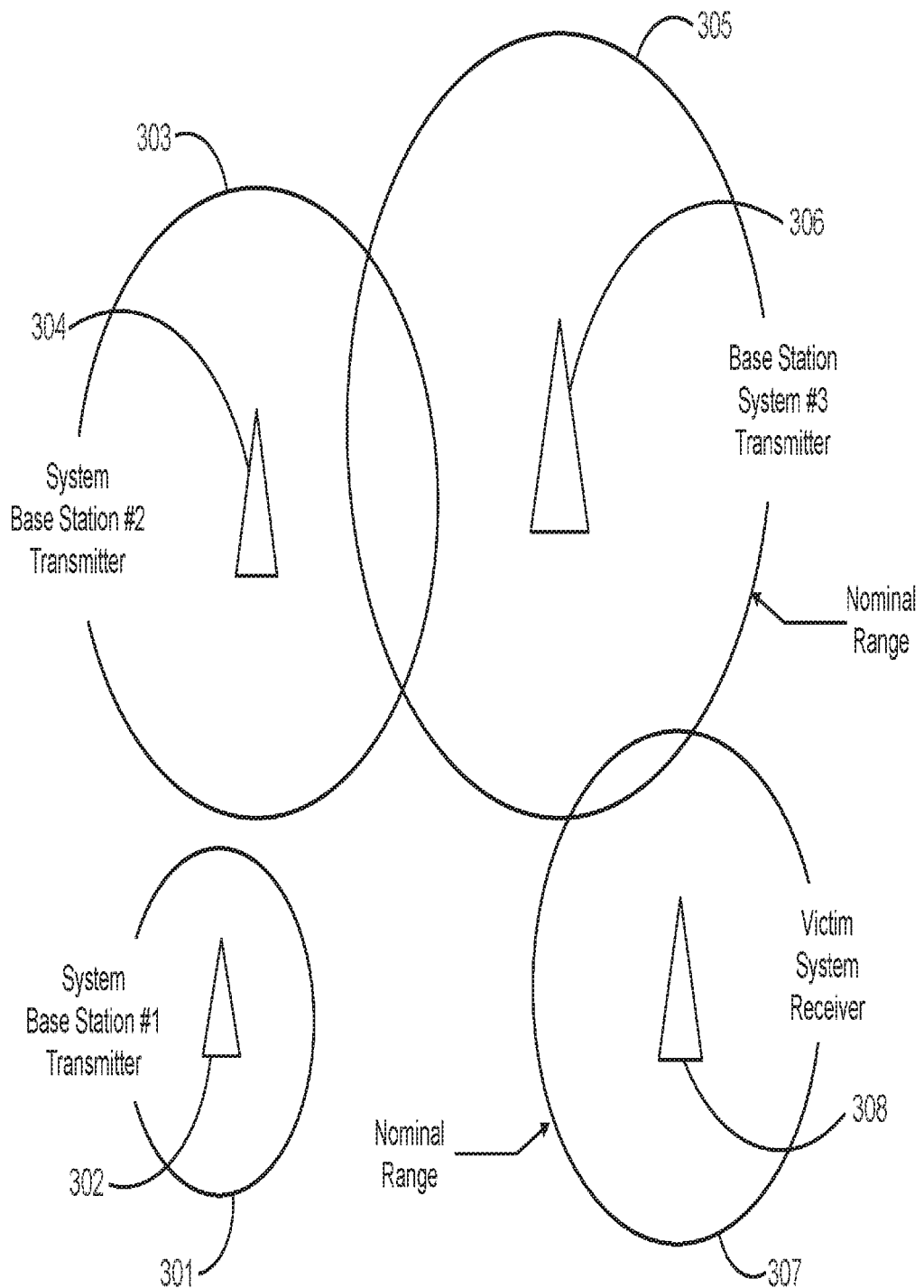
FIG. 3 depicts a scenario where a co-channel transmitter may be causing interference to a victim receiver due to an overlap in the coverage area.

The "Blank Burst" methodology employs techniques to automatically isolate, measure, report, suggest, and optionally adjust the level of co-channel interference sources operating in a shared spectrum environment. FIG. 3 illustrates a scenario where a co-channel transmitter may be causing interference to a victim receiver due to an overlap in the coverage area. Once an interferer is identified by a victim receiver, the Blank Burst process begins with the exchange of information within the Distributed Spectrum Interference Management System (DSIMS) as illustrated in the block diagram of FIG. 4, where information is being requested from a potentially-interfering system at the request of a victim receiver/system using DSIMS and its companion databases.

An important benefit of the "Blank Burst" method for automating the process of interference management and mitigation is the utilization of policy management, big data analytics, and machine learning to rapidly identify the source of potential interference and to enable measurement of the signal at the victim's receiver. If meaningful interference is detected, the transmitter can be requested to reduce power or optionally reduce power automatically if allowed by the rule base. The key to detecting the strength of interference at the victim's receiver is to measure the signal level during the "Pre-Blank Burst" interval, to then measure the signal level during the "Blank Burst" interval, and lastly to measure the signal level during the "Post-Blank Burst" interval. The victim's receiver can then determine if there is a measurable reduction in signal level observed during the "Blank Burst" interval from a particular interference source as illustrated FIG. 5. This process flow is further illustrated in FIG. 6 which describes the actions of the Blank Burst operation between a potentially interfering transmitter and a victim's receiver.

Figure 7:
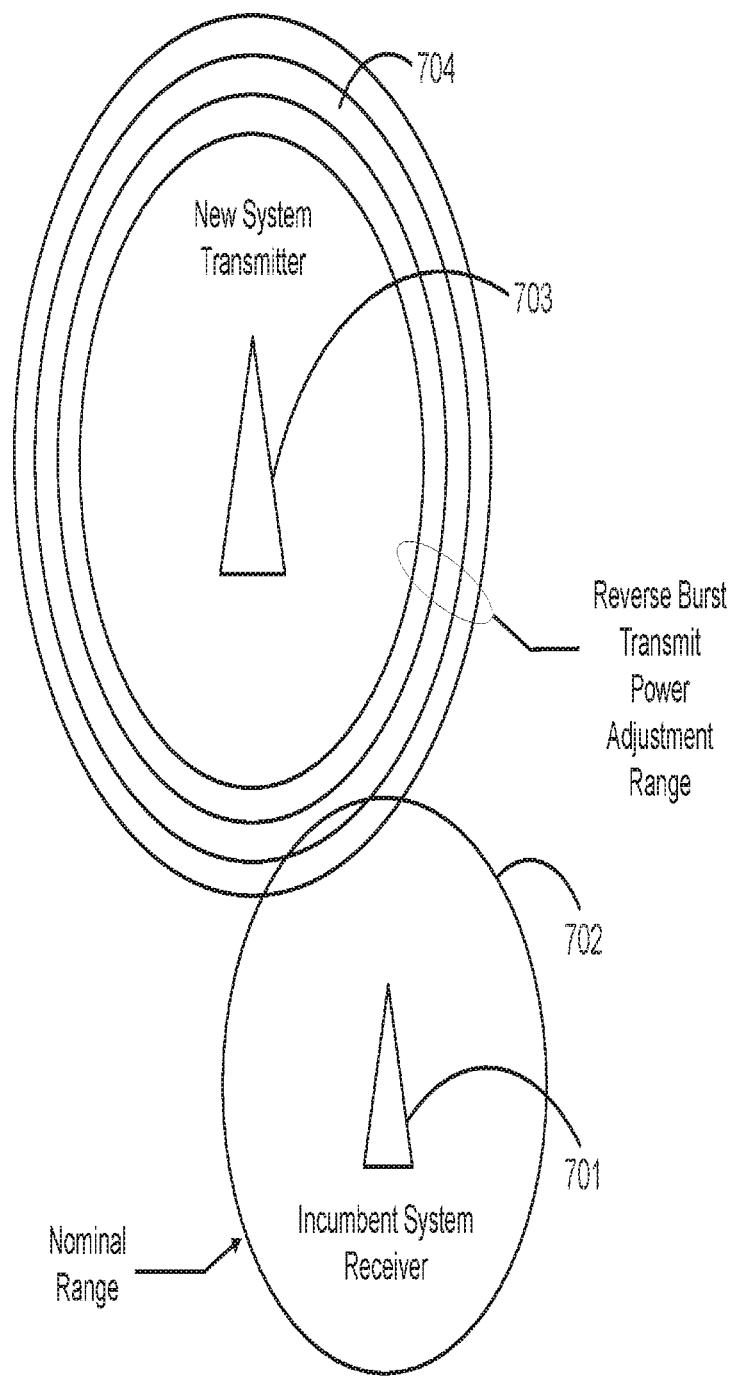
FIG. 7 depicts a scenario where a Reverse Blank Burst operation may be used to determine a new or prospective transmitter's power level at an incumbent receiver that may result in acceptable interference.
Figure 8:
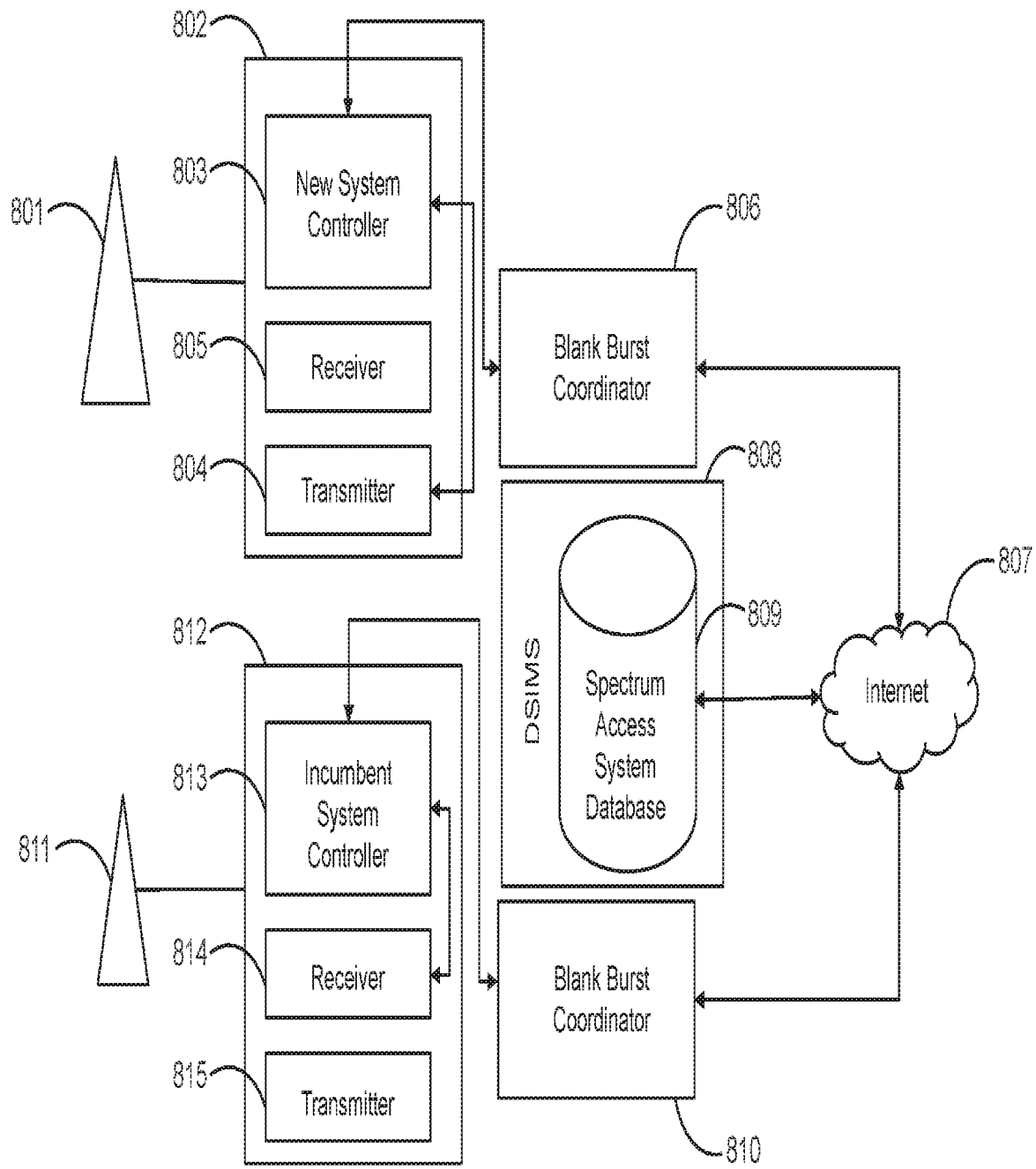
FIG. 8 is a block diagram of a Reverse Blank Burst operation initiated by a new or prospective transmitter interacting with an incumbent or existing receiver using a DSIMS system and companion DSIMS databases to determine if interference is caused.

The "Blank Burst" methodology can be further extended as the "Reverse Blank Burst" where a new or prospective system transmitter is installed and a need exists to assess the potential interference offered to an incumbent's receiver. Instead of dimming or eliminating the transmit power level during the burst, it is instead increased. The signal level experienced by the receiver during the burst quantifies how much excess signal is contributed. The process can be sequentially applied to determine how much interference can be tolerated at the receiver without harm. FIG. 7 shows a situation where a new system's transmitter has been established adjacent to an incumbent system's receiver. The coverage radius of the new transmitter may be adjusted using the Reverse Blank Burst to hold interference within the limit of harmful interference set by the policy management systems' rules. The Reverse Blank Burst process flow is illustrated in FIG. 8. This Reverse Blank Burst Operation System block diagram uses the DSIMS system and companion database to determine if unacceptable interference may be caused by the new or prospective transmitter's power level at an incumbent receiver and to reduce it either by request or automatically if policy management systems' rules allows.

Figure 9:
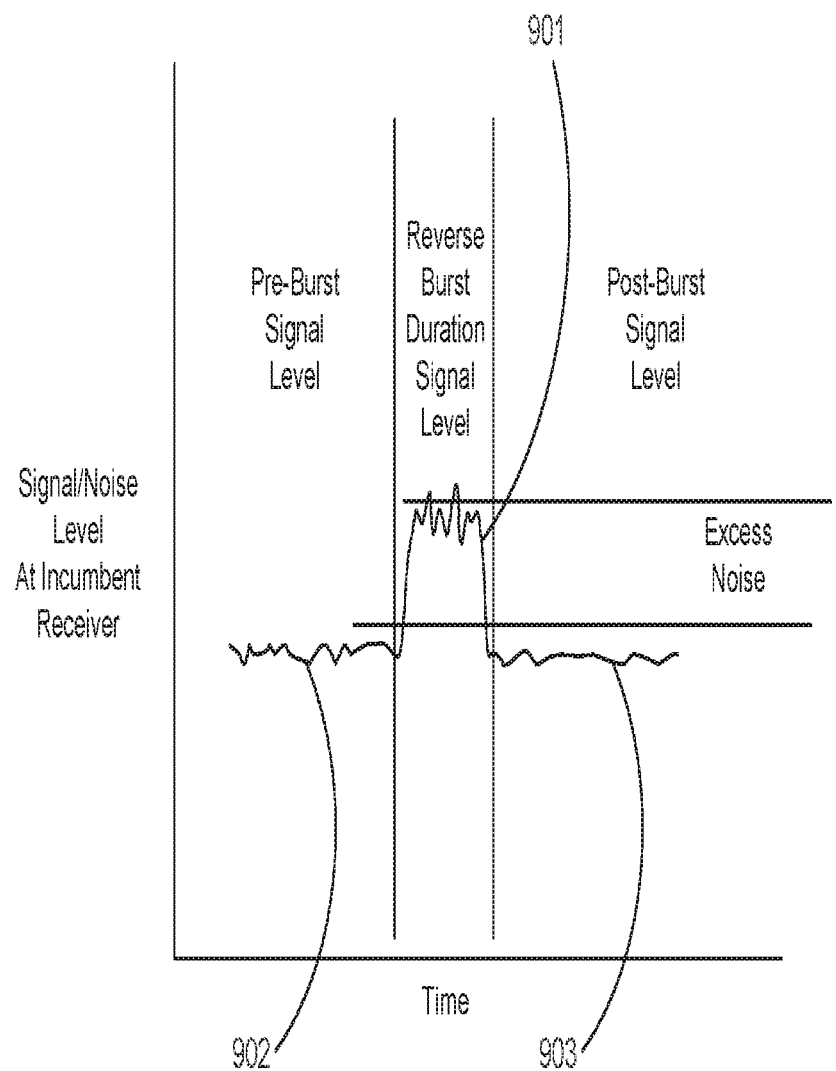
FIG. 9 shows an example of a measurable increase in signal level at a victim receiver during a Reverse Blank Burst interval.

The key to determining a new or prospective transmitter's power level at an incumbent receiver that may result in an acceptable interference power level is to measure the signal level during the "Pre-Reverse Blank Burst" interval, to then measure the signal level during the "Reverse Blank Burst" interval and then to measure the signal level during the "Post-Reverse Blank Burst" interval in order to assess how much power the transmitter can emit while still resulting in an acceptable co-channel noise level at an incumbent receiver. The process is illustrated in FIG. 9, where the incumbent receiver detects the co-channel signal during the "Reverse Blank Burst" interval from the new or prospective system transmitter. This Reverse Blank Burst process flow is further illustrated in FIG. 10 which describes the process flow of the Reverse Blank Burst operation assessing a new or prospective system's transmitter excess noise contribution at an incumbent's receiver.

Figure 11:
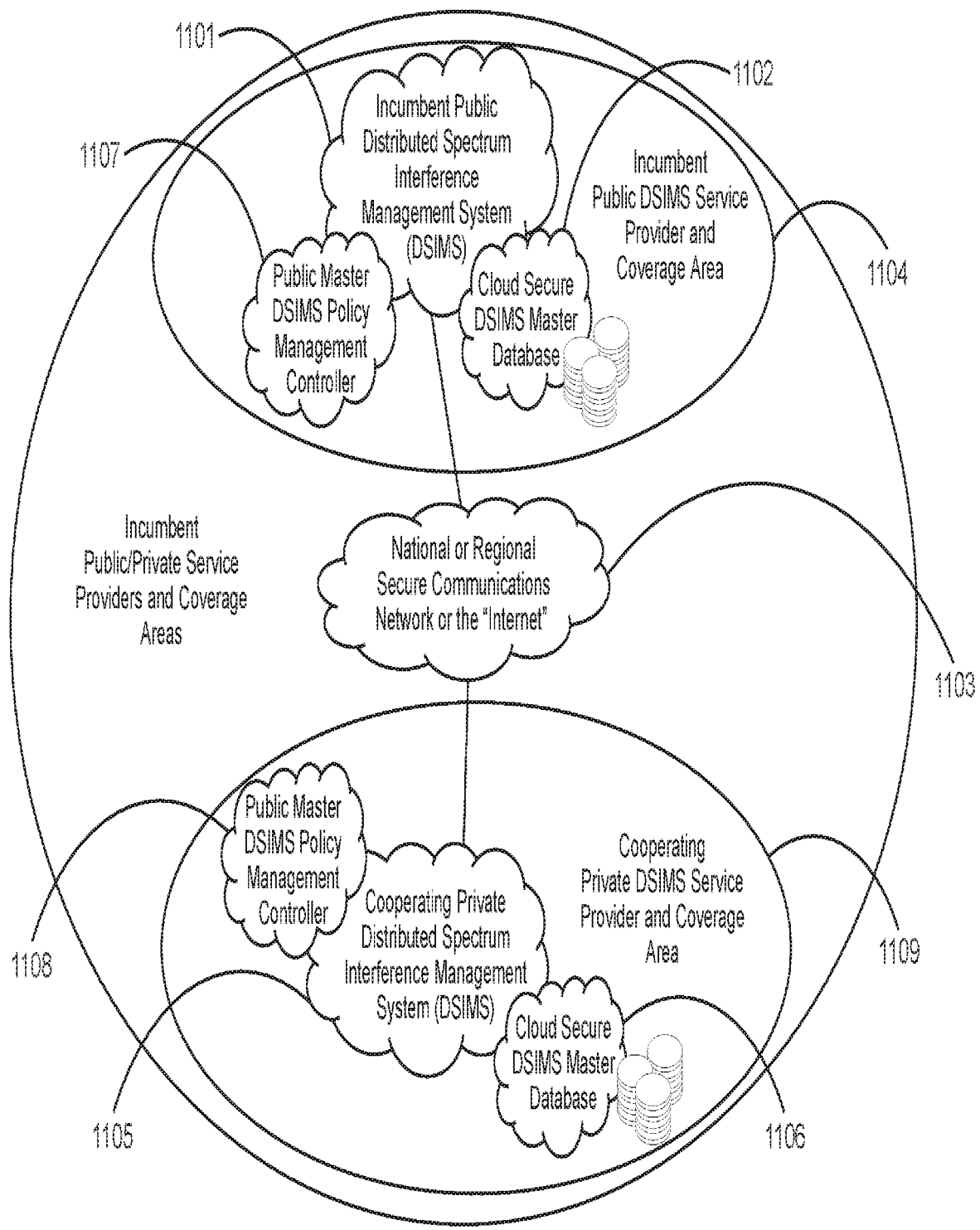
FIG. 11 depicts an example of a public/private DSIMS architecture to facilitating interactions between public and private DSIMS systems.

The Guided Distributed Spectrum Interference Management System (DSIMS) and/or a Distributed Spectrum Coordinating Clearinghouse Process can also be utilized in a Public/Private system architecture configuration as illustrated in the architectural diagram of FIG. 11. FIG. 11 shows an incumbent Public DSIMS Service Provider with a master database cooperating with a Private DSIMS Service Provider and associated master database which is interconnected by a national or regional secure communications network or the "Internet" to enable the exchange of information to mitigate interference between these cooperating Public Distributed Spectrum Interference Management Systems and companion Cloud Secure DSIMS Master Database and Private Distributed Spectrum Interference Management Systems and companion Cloud Secure DSIMS Master Database.

Figure 12:
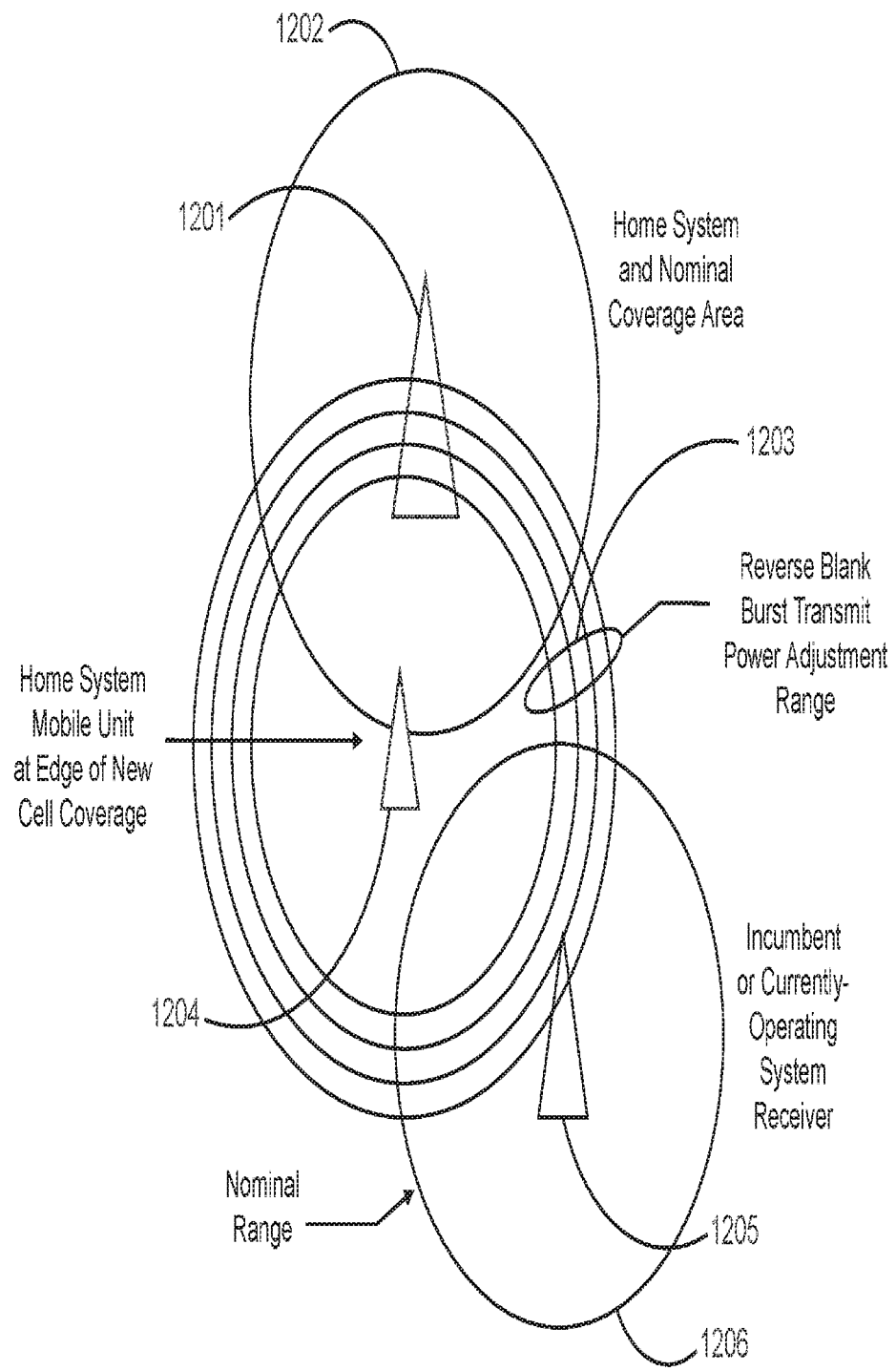
FIG. 12 shows a scenario where a home system's mobile unit may cause interference to an incumbent or currently operating victim receiver.
Figure 13:
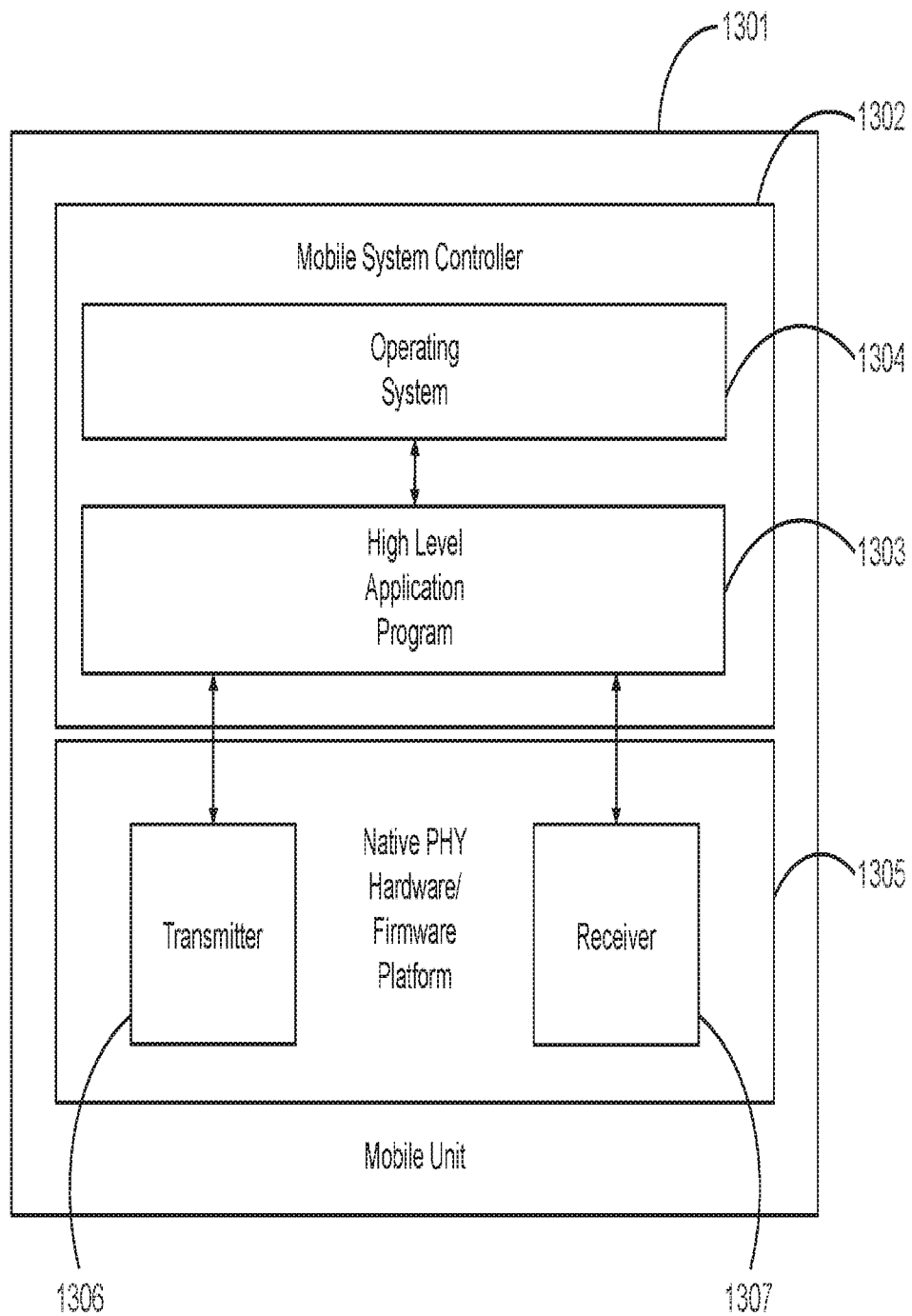
FIG. 13 shows a block diagram of a mobile unit with a high-level application program supporting combined Blank Burst and Reverse Blank Burst operation.

The Public/Private System Architecture can be used to measure and mitigate interference to a Public Incumbent System as illustrated in FIG. 12. In this example, a Home (Private) System Mobile Unit is communicating at the edge of a Public Incumbent System. The Home System Mobile Unit may, if it remains in place continuously, interfere with the incumbent system's receiver. The Blank Burst and Reverse Blank Burst procedures can be used to balance the transmit power of the mobile unit so it operates acceptably with the home system while reducing interference to the public system. FIG. 13 illustrates a Home System Mobile Unit Architecture with the built-in capability of a high-level application program supporting combined Blank Burst and Reverse Blank Burst operation stored program control software.

Figure 14:
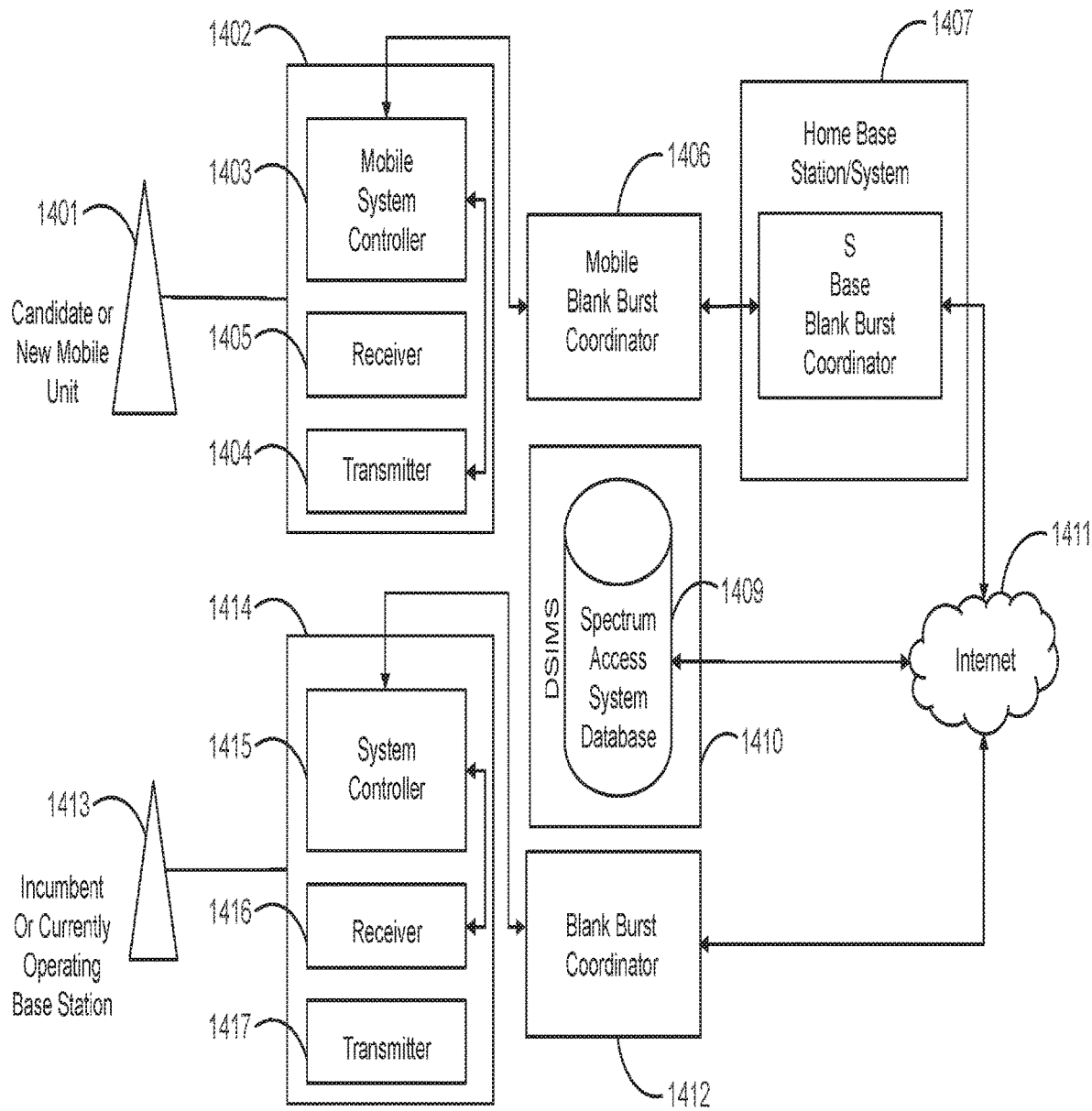
FIG. 14 is a block diagram of Blank Burst/Reverse Blank Burst by a potentially interfering mobile unit at the request of a victim receiver/system using a DSIMS system with a companion DSIMS database.
Figure 15:
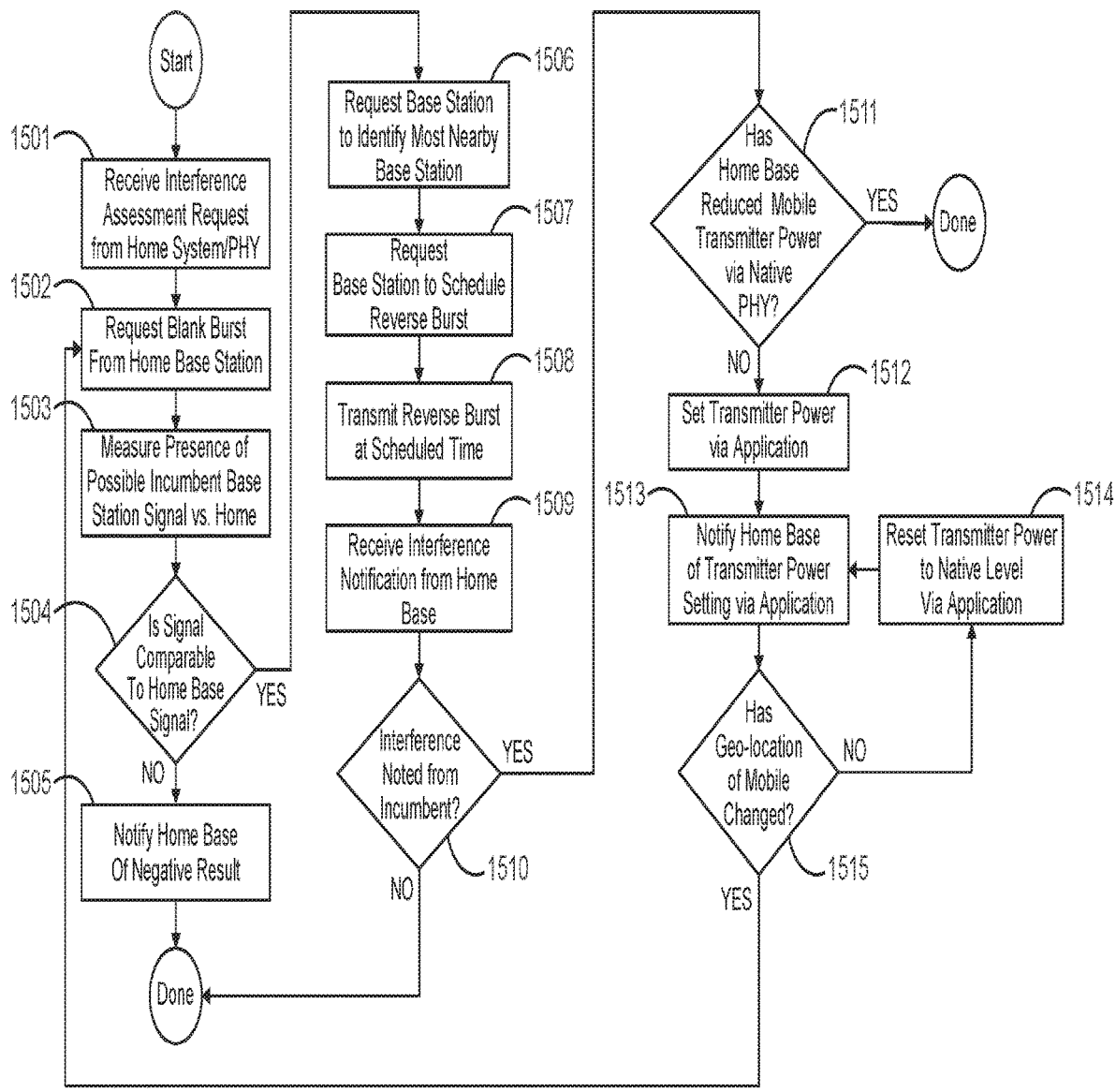
FIG. 15 depicts a process flow illustrating the process steps of Blank Burst and Reverse Blank Burst between a potentially interfering new or prospective transmitter and an incumbent or currently operating victim receiver.

FIG. 14 shows a block diagram which identifies the important elements of the Public/Private mobile interference management process. The process flow in FIG. 15 illustrates the interactions between the Private System Base Station, Private Mobile Unit, and Public System Base Station using the DSIM to orchestrate the required actions.

Referring to FIG. 1, a Guided Distributed Spectrum Interference Management System (DSIMS) Architecture with Policy Management may consist of a national or regional cloud public or private Distributed Spectrum Interference Management System (DSIMS) 101 connected to a national or regional secure communications network or the "Internet" 103. The DSIMS system provides for a Master DSIMS Policy Management Controller 111 to execute and manage the rule based policy management algorithms, analytic algorithms, and the machine learning algorithms. The cloud-based secure DSIMS Master Database 102 is a data warehousing function for continuously collecting, storing and organizing data, such as, system identity information, radio system transmission properties and radio interference data of all the Local Public and/or Private Spectrum Sharing Wireless Communication Systems 105, 107, and 109 which are associated with a particular public and/or private Distributed Spectrum Interference Management System (DSIMS). This public and/or private Distributed Spectrum Interference Management System (DSIMS) is also connected to a national secure communications network and/or the "Internet" 103. The DSIMS system of Local Public and/or Private Spectrum Sharing Wireless Communication Systems may also collect and analyze data created from policy management rule based algorithms for the purpose of identifying occurrences of interference to potential victim receivers and to coordinate mitigation utilizing the Blank Burst and Reverse Blank Burst Methods. The DSIMS system data collection and storage process includes system identity information, radio transmission system properties and interference initiator's and/or victim's data for later processing by the Master Policy Management Controller (MPMC) analytic algorithms which are utilized to isolate sources of initiator interference to potential victim(s) and to mitigate it utilizing the Blank Burst and Reverse Blank Burst Methods.

In various embodiments, the Blank Burst and Reverse Blank Burst methods may require that all Local Public or Private Spectrum Sharing Wireless Communication Systems register with the national or regional Cloud DSIMS system 101 by establishing a communication network connection or an Internet connection to the DSIMS via a national secure communications network or the "Internet" 103 to register their identities and properties. In some embodiments, registration of one or more Local Public or Private Spectrum Sharing Wireless Communications Systems with the national or regional cloud DSIMS 101 may not be required for operation of the system according to the present teachings.

In another embodiment, The DSIMS Master Policy Management Controller may include a cloud-based application that pro-actively monitors co-channel interference on behalf of a system/service operator whose receiver(s) could experience co-channel interference. This interference might occur as a result of emissions from transmitters external to the operator's service, or emissions by transmitters in the operator's own network. In such an "Interference Management as a Service" (IMaaS) arrangement, the DSIMS uses its Master Policy Management controller to connect to a system/service operator's network controller directly via a secure link to sample each receiver's signal strength and other characteristics remotely at intervals. The application is thus used to highlight potential interference conditions at individual receiver locations that may benefit from treatment by Blank Burst and Reverse Blank Burst processes as described previously. If a signature of potential interference is detected, the DSIMS issues a Potential Interference Indicator (PRI) message to alert the operator's system so that Blank Burst and Reverse Blank Burst operations may be begun by the operator's Blank Burst Coordinator. Use of the IMaaS cloud application permits the DSIMS to manage the entire process of automatically detecting, isolating, measuring and mitigating co-channel interference for a wireless communications system operator, if desired.

Once some, or all Local Public or Private Spectrum Sharing Wireless Communication Systems, 1-n, are registered with the Cloud Secure DSIMS Master Database 102, they can utilize the Blank Burst and Reverse Blank Burst methods to isolate and measure the presence of co-channel interference experienced by a receiver sharing a frequency channel with other coordinated users as part of a Distributed Spectrum Interference Management System (DSIMS) to mitigate or eliminate such interference as a part of a Distributed Spectrum Interference Management System (DSIMS) network. Each Local Public or Private Spectrum Sharing Wireless Communications System (105, 107,109) houses a Local Secure Distributed Spectrum Interference Management System Database (106, 108, 110) containing information about the components and properties of the individual systems which participate in spectrum sharing.

Referring to FIG. 2, an exemplary embodiment of a Guided Distributed Spectrum Interference Management System (DSIMS) Process Flow for Spectrum Sharing Utilizing Blank Burst and Reverse Blank Burst Interference Mitigation Architecture is illustrated, consisting of a group of analytic processes which are a part of the DSIMS Master Policy Management Controller. The DSIMS Master Policy Management Controller provides the means for implementing and managing the rule based policy management system, big data analytics algorithms, and machine learning algorithms which exist as a part of the process flow for spectrum sharing utilizing Blank Burst and Reverse Blank Burst interference mitigation within a DSIMS system.

Once the Master DSIMS Policy Management Controller (PMC) receives an interference assessment request 201 from a Local DSIMS Policy Management Controller issued by a particular Local Spectrum Sharing Wireless Communication System, the DSIMS PMC launches a data collection process 202 to update the DSIMS Master Database with all relevant data from all Local Spectrum Sharing Wireless Communication Systems that are connected to the DSIMS system. After the DSIMS Master Database update, the Master DSIMS PMC analyzes the data based on the appropriate policy management algorithms to rank order all candidate Local DSIMS PMC Systems 203 that may constitute potential interferers relative to the Local DSIMS PMC request. Once the rank order list is established, the Master DSIMS PMC compares interference data based on the appropriate policy management, analytics, and machine learning algorithms from the rank order list arranged in ascending order 204 with Local DSIMS PMC interference assessment requests received from the Local Spectrum Sharing Wireless Communication System that is experiencing unacceptable interference. This process continues 205 until the Local Spectrum Sharing Wireless Communication System that is causing the interference is identified. Once the Local Spectrum Sharing Wireless Communication System that is causing the interference is identified, control is transferred to 206 from the Master DSIMS PMC to the Local DSIMS PMC of the Local Spectrum Sharing Wireless Communication System that is experiencing the high levels of interference to utilize the Blank Burst and Reverse Blank Burst method to resolve the high level of interference or coordinate/balance the level of interference between the two Local Spectrum Sharing Wireless Communication Systems.

Referring to FIG. 3, a DSIMS Blank Burst Candidate Interference Architecture is depicted, which illustrates an exemplary embodiment of a group of wireless systems/services with transmitter and receiver facilities operate in a geographic area where co-channel interference can arise. A system base station 302 is shown with a roughly centralized stylized coverage area 301 established by transmitter #1. Likewise, a second base station transmitter 304 is shown with coverage area 303, which partially overlaps coverage area 305 established by transmitter #3. The #3 transmitter 306 has a coverage area that partially overlaps the receiving coverage area of victim receiver 308 with base station receiver 307. Victim receiver 308 may experience measureable interference from 304 which degrades the system quality of the victim.

Figure 4:
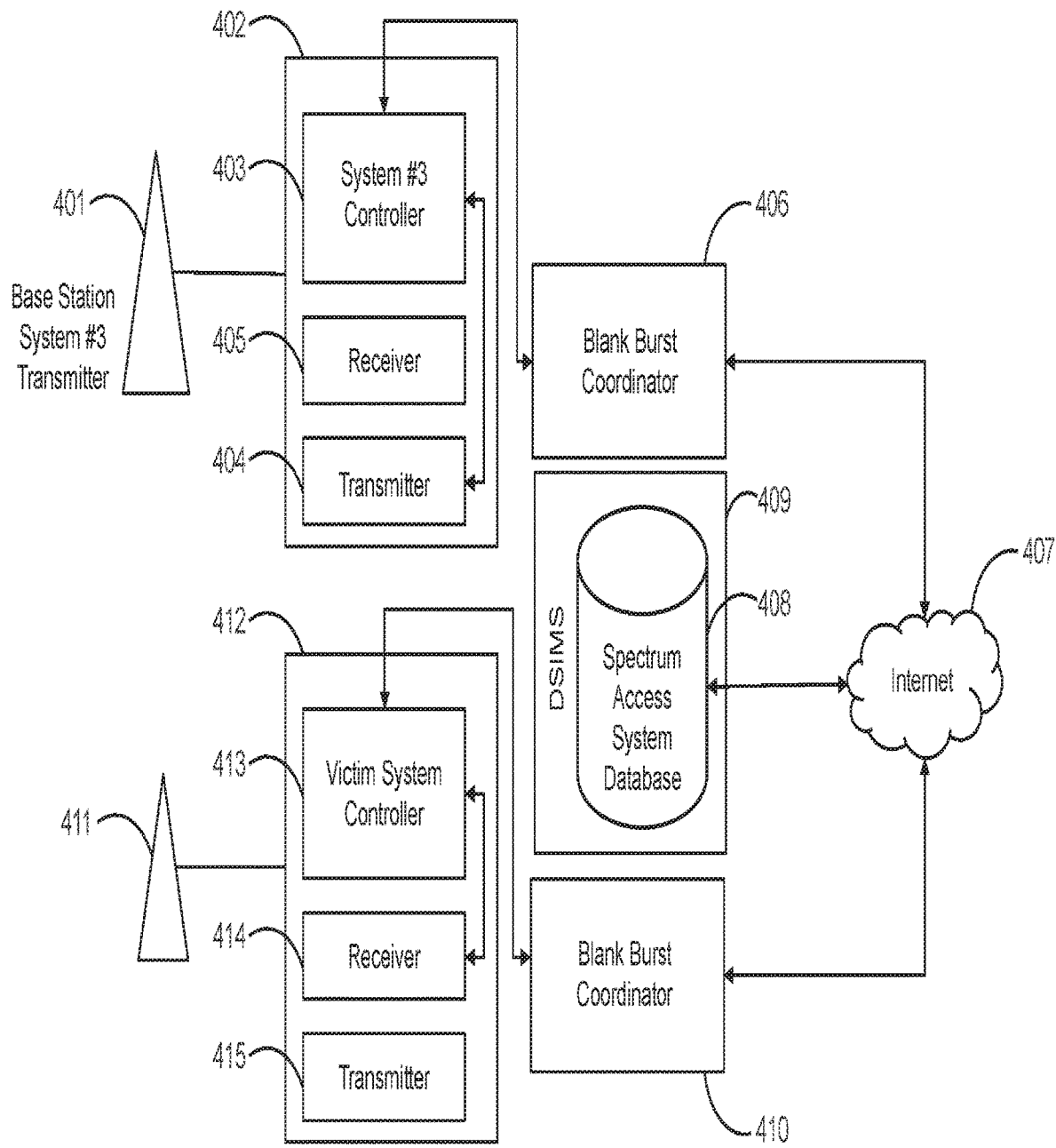
FIG. 4 is a block diagram of Blank Burst operation by a potentially-interfering system at the request of a victim receiver/system using a DSIMS system and companion DSIMS databases.

FIG. 4 illustrates a DSIMS Blank Burst System Configuration that depicts the transmission antenna 401 of a potentially-interfering transmitter as part of base station 402. The base station 402 utilizes a stored program system controller 403 to orchestrate the operations of transmitter 404 and receiver 405. During a Blank Burst operation, the system controller 403 is connected to the Blank Burst Coordinator 406, an auxiliary stored program controller implemented with base station 402, to administer the operation of the Blank Burst method and protocol. During a Blank Burst 406 is connected through the Internet 407 to Distributed Spectrum Interference Management System Database 408 which is part of a DSIMS 409 or a DSIMS. Likewise, the receiving antenna 411 of the victim system is attached to victim base station 412.

Victim system controller 413, part of base station 412, orchestrates operation of the system's receiver 414 and transmitter 415. Victim system controller 413 connects to the Blank Burst Coordinator 410 and hence to the Internet 407 and to Distributed Spectrum Interference Management System Database 408 which is part of DSIMS 409. If victim receiver 414 experiences interference, 414 uses the victim system controller 413 and Blank Burst Coordinator 410 to access information in database 408 to discover one or more transmitter instances which may be contributing interference. Having selected a candidate transmitter, 413 obtains the Internet address of the potential interfering transmitter and establishes a secure link via the Internet 407. The link is used to convey Blank Burst protocol information necessary to set up, execute, and interpret the Blank Burst to disclose whether interference is present at the victim receiver 414 from transmitter 405.

Figure 5:
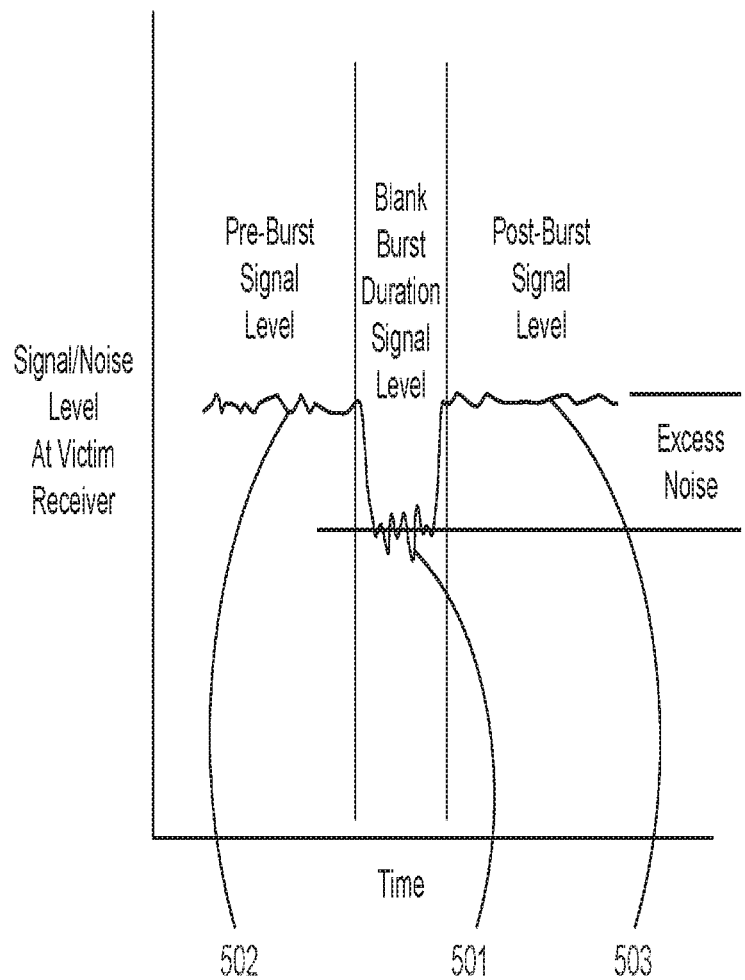
FIG. 5 shows an example of a measurable reduction in signal level at a victim receiver during a Blank Burst interval.

FIG. 5 illustrates a DSIMS Blank Burst Excess Noise Determination Architecture that depicts the signal strength measurement waveform present at the victim receiver during the period of the Blank Burst process. The signal strength present during the Blank Burst 501 represents the level during which the putative transmitter reduces or eliminates emissions. The signal strength present before the elimination or "dimming" of the transmitter is represented in 502. The signal strength present after the transmitter power is reduced or eliminated is represented in 503. The lowered signal strength during interval 501 illustrates what would be measured if the transmitter was contributing measurable interference to the victim. If the burst interval level remained unaffected or dropped only slightly during the burst (less than necessary for meaningful interference to be present), it would be assumed that the putative transmitter was not interfering appreciably.

Figure 6:
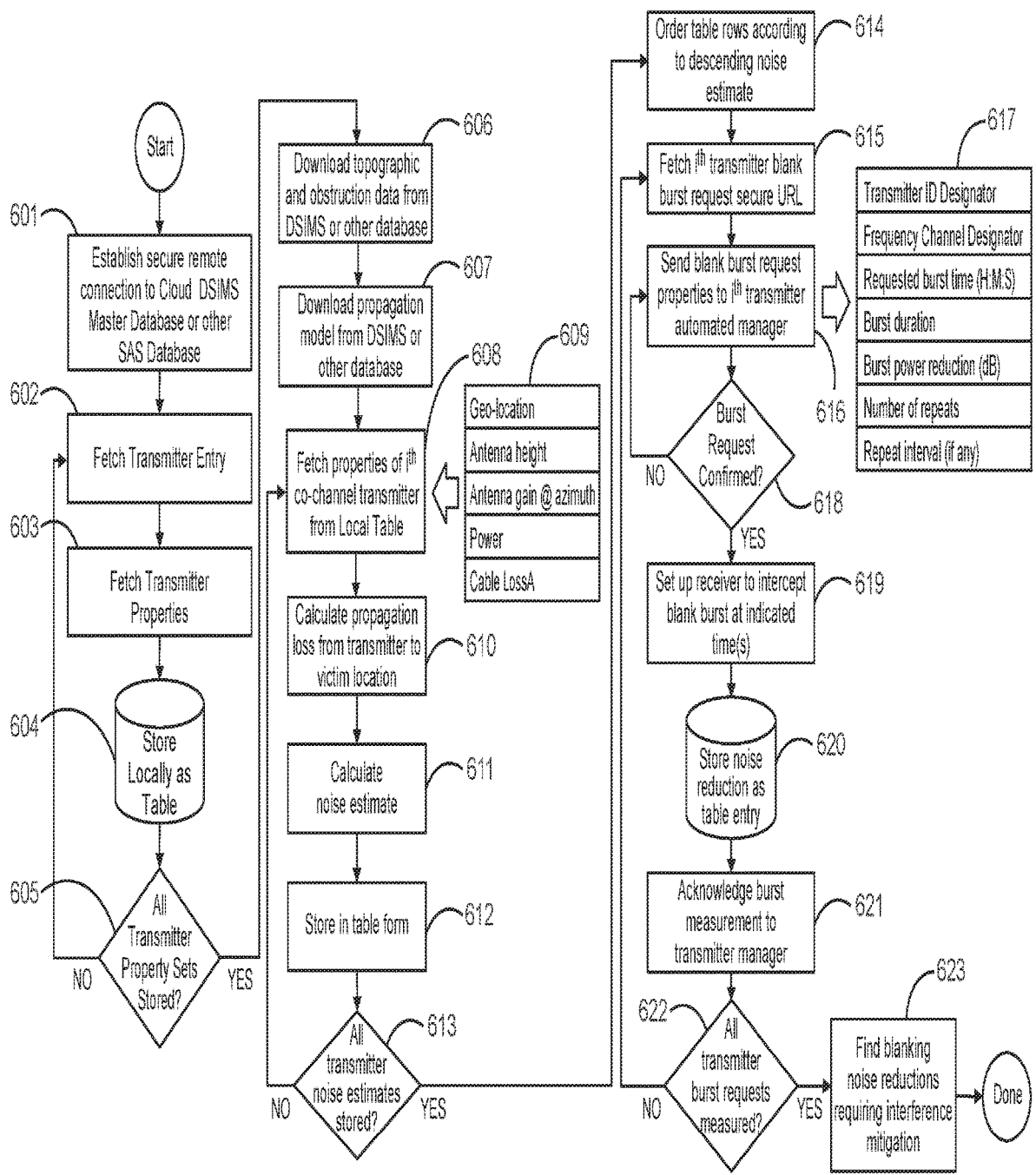
FIG. 6 depicts a process flow illustrating the process steps of a Blank Burst operation between a potentially interfering transmitter and a victim receiver.

FIG. 6 illustrates a DSIMS Blank Burst Process Flow that represents an exemplary order of operations in a typical Blank Burst process flow. The process begins with block 601, which is invoked when a victim receiver has determined it is being interfered with and connects securely to the DSIMS and database via the Internet. At block 602, the victim Blank Burst Coordinator fetches the entry of each transmitter from the DSIMS database. At block 603 the properties of each transmitter entry are retrieved. At block 604 the properties of each transmitter are stored in a local database. At block 605 a decision is made as to whether all transmitter entries and property sets have been stored. If not, the process continues at 602 to recover the next transmitter entry and property set. If 605 determines that all transmitter and property entries have been stored, the process continues at step 606, where topographic and obstruction data is downloaded from local database #1. This database may be located within the incumbent receiver's connectivity domain as part of a DSIMS. Similarly, downloading of a suitable propagation model is downloaded at 607 from local database #2.

At block 608, the first block 609 of properties of a candidate interfering transmitter is fetched. At 610, the propagation loss between a candidate transmitter and the victim receiver is calculated using the topographic/obstruction data and propagation model previously downloaded. At block 611, the amount of excess noise from the candidate interfering transmitter is calculated. At block 612 the excess noise calculation is stored. At block 613 a decision is reached as to whether all candidate transmitter noise calculations have been stored. If not, execution proceeds to block 508, after which steps 609, 610, 611, and 612 are repeated. At block 613, the decision is then made to check if all noise calculations have been stored. If "yes", execution moves to block 614 where the excess noise estimates with their companion transmitter entries and properties are stored in an ordered table with the highest estimated excess noise estimate first. At block 615, the data for the first entry in the transmitter table (which is the entry assigned the highest estimated excess noise contribution) is retrieved and the corresponding Uniform Resource Locator (URL) is used to open a secure link using the Internet.

At block 616 the Blank Burst Coordinator sends the information block 617 to the $i^{th}$ transmitter Blank Burst Coordinator to set up the Blank Burst event. Block 618 persists until the Blank Burst Coordinator at the transmitter returns a confirmation that the event has been scheduled. At 619, the victim Blank Burst Coordinator prepares the victim receiver to record the pre-Blank Burst, Blank Burst, and post-Blank Burst signal strength at the scheduled event time. The noise reduction during the Blank Burst Interval (501 on FIG. 5) is stored as a table entry at 620. At block 621 the victim Blank Burst Coordinator sends the excess noise reduction measurement to the $i^{th}$ transmitter Blank Burst Coordinator as an acknowledgement. If all transmitter Blank Burst requests have been measured at 623, the noise reduction measurements indicating remediation are flagged. If block 622 indicates there are more candidate transmitters that require Blank Burst measurement, the process moves to block 615 where the process repeats the steps until all candidate transmitters have been measured using the Blank Burst process.

Referring to FIG. 7, a DSIMS Reverse Blank Burst Interference Architecture is depicted, which is a second preferred embodiment of the Blank Burst called a Reverse Blank Burst. The Reverse Blank Burst usage is shown in an example where an incumbent receiver 701 with a nominal range of a stylized coverage area 702 may experience interference from a new transmitter 703 with adjustable transmitter power level corresponding to coverage area 704.

FIG. 8 illustrates a DSIMS Reverse Blank Burst System Configuration that shows a block diagram of a new system transmitting antenna 801 of a new system base station 802 consisting of system controller 803, transmitter 804, and receiver 805. The system controller 803 is connected to Blank Burst Coordinator 806 which is, in turn, connected to a DSIMS 808 which contains a Distributed Spectrum Interference Management System Database 809 via the Internet 807. Likewise, an existing incumbent system which might experience interference from the new transmitter has an incumbent antenna 811 connected to the incumbent system base station 812. The base station consists of a system controller 813 with receiver 814 and transmitter 815. The incumbent system controller is connected to Blank Burst Coordinator 810 and hence to DSIMS 808 with Distributed Spectrum Interference Management System Database 809 via the Internet 807. During Blank Burst or Reverse Blank Burst operations, the incumbent system Blank Burst Coordinator or the new system Blank Burst Coordinator, respectively, contacts the opposite system's Coordinator via the information provided by Distributed Spectrum Interference Management System Database 809.

FIG. 9 illustrates a DSIMS Reverse Blank Burst Excess Noise Determination example that shows the signal strength measurement waveform present at the incumbent receiver during the time of the Reverse Blank Burst process. The signal strength present during the Reverse Blank Burst 901 represents the level during which the prospective new transmitter produces the Reverse Blank Burst emission. The signal strength present before the transmitter emits the Reverse Blank Burst is represented in 902. The signal strength present after the transmitter emits the Reverse Blank Burst is represented in 903. The signal strength of 901 would be that experienced if the transmitter was contributing interference to the incumbent. If the burst interval level remains unaffected or increases only slightly (less than necessary for harmful interference to be present), the system determines that the prospective new transmitter is not interfering appreciably.

Figure 10:
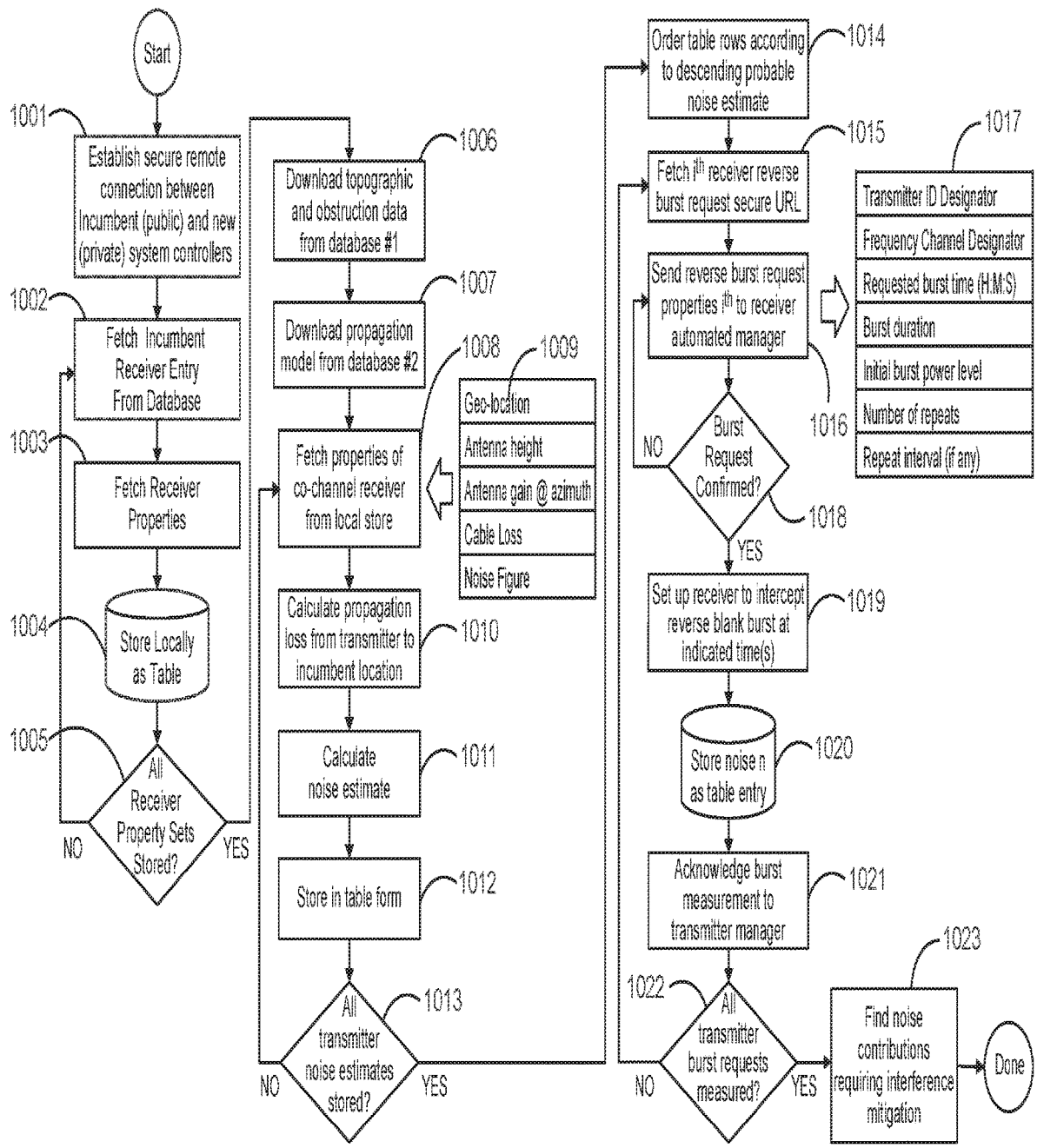
FIG. 10 depicts a process flow illustrating the process steps of a Reverse Blank Burst operation between a potentially interfering new or prospective transmitter and an incumbent or currently operating victim receiver.

FIG. 10 represents an exemplary order of operations in a typical DSIMS Reverse Blank Burst Coordinator process flow. The process begins with block 1001, which is invoked when a prospective new transmitter initiates an evaluation to determine whether its emissions may interfere with one or more in-range incumbent receivers, when it connects securely to the Distributed Spectrum Interference Management System and Distributed Spectrum Interference Management System Database. At block 1002, the new system controller retrieves the first entry of a potentially-affected receiver. At block 1004 data that defines the properties of each receiver are stored in a local database in the form of a table. At block 1005 a decision is made as to whether all receiver entries and property entries are stored. If not, the process continues at 1002 to isolate the next receiver and property set. If, at block 1005, all receivers and property sets have been stored, the process continues at step 1006, where topographic and obstruction data is downloaded from a database. This database may or may not be part of the DSIMS and would typically be located locally within the new transmitter's connectivity domain. Likewise downloading of a suitable propagation model is completed at 1007 from the database. This database also may or may not be part of the DSIMS.

At block 1008, the block 1009 of properties of a candidate interfering transmitter is retrieved. At 1010, the propagation loss between the new candidate transmitter and the victim receiver is calculated using the topographic/obstruction data and propagation model previously downloaded. At block 1011, the estimated propagation loss between the new prospective interfering transmitter and the incumbent receiver is calculated. At block 1012 the excess noise calculation derived from the new transmitter's power level and the propagation loss is stored. At block 1013 a decision is reached as to whether all candidate transmitter excess noise calculations have been stored. If not, execution proceeds to block 1008, after which steps 1009, 1010, 1011, and 1012 are repeated. At block 1013, the decision is again made to determine if all noise calculations have been stored. If the answer at block 1013 is "yes", the process moves to block 1014 where the excess noise estimates with their companion receiver entries and properties are stored in an ordered table ranking the highest estimated noise first. At block 1015, data associated with the first entry in the transmitter table (highest estimated excess noise contribution) is retrieved and the corresponding URL is used to open a secure link to the incumbent Blank Burst Coordinator using the Internet.

At block 1016, the new transmitter's Blank Burst Coordinator sends the information block 1017 to the $i^{th}$ receiver Blank Burst Coordinator to set up a Reverse Blank Burst event. Block 1018 persists until the Blank Burst Coordinator at the receiver returns a confirmation that the event has been scheduled. At block 1019, the incumbent Blank Burst Coordinator prepares the receiver via the System Controller to record the pre-Reverse Blank Burst, Reverse Blank Burst, and post-Reverse Blank Burst signal strength at the scheduled event time. The noise increase during the Reverse Blank Burst Interval (in block 901 on FIG. 9) is stored as a table entry at block 1020. At block 1021 the $i^{th}$ incumbent Blank Burst Coordinator sends the excess noise increase measurement to the new transmitter's Blank Burst Coordinator as an acknowledgement.

If all incumbent receiver Reverse Blank Burst requests have been measured at block 1023, the noise increase measurements indicating remediation are flagged. If block 1022 indicates there are more candidate incumbent receivers that require Reverse Blank Burst measurement, the process moves to block 1015 where the steps are repeated until all candidate receivers have been measured using the Reverse Blank Burst process. The process proceeds to block 1023 is reached when relevant excess noise increases for one or more incumbent receivers are isolated for interference mitigation. Such mitigation may involve reduction of new transmitter power level, adjustment of antenna pattern, null steering or other adjustments to transmitter operation. If the rule base allows, power level adjustments can also be conducted automatically.

FIG. 11 illustrates a Cooperating Architecture for Public and Private DSIMS systems that depict a third preferred embodiment and architectural design, where in lieu of an FCC-like multi-service/system SAS, the Blank Burst or Reverse Blank Burst method and apparatus is used with a cooperating Public Distributed Spectrum Interference Management Systems and companion Cloud Secure DSIMS Master Database 1104 and a Private Distributed Spectrum Interference Management Systems and companion Cloud Secure DSIMS Master Database 1109. In such an arrangement, an incumbent Public Distributed Spectrum Interference Management System (DSIMS) 1101 containing a Cloud Secure DSIMS Master Database 1102 with the capabilities to communicate with an incumbent Private Distributed Spectrum Interference Management System 1105 which contains a companion Cloud Secure DSIMS Master Database 1106 to share information to mitigate interference between both public and private DSMIS systems. In this architecture arrangement the incumbent Public Distributed Spectrum Interference Management System 1101 is interconnected via a national or regional secure communications network or the "Internet" 1103 to a cooperating incumbent Private DSIMS Service Provider and Coverage Area 1109 with an incumbent Private Distributed Spectrum Interference Management System 1105 which contains a companion Cloud Secure DSIMS Master Database 1106 to share information for the purpose of mitigating interference between both public and private DSMIS systems.

FIG. 12 illustrates a DSIMS Reverse Blank Burst Mobile Unit Candidate Interference example that depicts the use of the Blank Burst and Reverse Blank Burst method and apparatus to detect, measure, and mitigate interference to an incumbent system's base station receiver that may be caused by a mobile unit's transmissions to a nearby host system. The transmitter of mobile unit 1204 routinely operates with "home" service/system 1201 having a stylized coverage area 1202. The mobile transmitter's RF power level can be adjusted by using the Reverse Blank Burst setting, resulting in a stylized coverage area range 1203. The transmitter's output at some level may interfere with an incumbent's base station receiver 1205 with stylized coverage area 1206. The Reverse Blank Burst method can be used to determine a compromise power level at the mobile unit with an attendant coverage area that reduces interference at the incumbent base station.

FIG. 13 depicts a block diagram of the mobile unit 1301 operated by Mobile System Controller 1302, wherein a DSIMS Mobile Blank Burst or Reverse Blank Burst Stored Program Application is employed. A High-Level Application Program 1304 is interposed between the System Controller's Operating System 1303 and the Native PHY Transmitter and Receiver Hardware/Firmware Platform 1305. The Platform typically consists of native PHY Hardware and Firmware for Transmitter 1306 and Receiver 1307. The application program allows the Blank Burst/Reverse Blank Burst protocol elements to be operated via the home system/service's Internet connection.

FIG. 14 depicts a DSIMS Blank Burst or Reverse Blank Burst Mobile/Base system, which is shown as an exemplary block diagram illustrating the use of the Reverse Blank Burst method and apparatus with a home system/service base station, home mobile unit, and an incumbent base station receiver. The Home Mobile Unit Antenna 1401 is connected to the Home Mobile Unit 1402. The System Controller 1403 provides the operating system and application hosting functionality supporting operation of Mobile Transmitter 1404 and Receiver 1405. When the mobile unit begins a Reverse Blank Burst procedure, it utilizes the System Controller 1403 and application code connection to the Mobile Blank Burst Coordinator 1406. The Mobile Coordinator connects to the Base Blank Burst Coordinator 1407 using the native wireless system's data connectivity.

The Mobile Blank Burst Coordinator negotiates with the Reverse Blank Burst Coordinator at the base station to initiate a Blank Burst of its own transmitter. This is used to allow the mobile receiver to determine the strength of an incumbent base station's signal compared to the host base station's signal. The comparison allows the mobile unit to determine if an incumbent base station might be an interference victim. The Blank Burst is then followed by scheduling of a Reverse Blank Burst event with the most probable incumbent base station. The Mobile Reverse Blank Burst Coordinator requests the home base station's Reverse Blank Burst Coordinator to contact the candidate incumbent's Blank Burst Coordinator 1412 via a secure link through the Internet 1411. To accomplish this addressing function, the home base station's Blank Burst Coordinator accesses the Distributed Spectrum Interference Management System (DSIMS) 1410 with Database 1409. The candidate incumbent's antenna 1413 is connected to its system base station 1414 consisting of System Controller 1415, Receiver 1416 and Transmitter 1417. The controller is connected to the incumbent's Blank Burst Coordinator and hence to the Internet 1411.

FIG. 15 depicts an exemplary DSIMS flow process with Mobile Blank Burst and Reverse Blank Burst Interference Mitigation showing the execution of the steps to accomplish detection, measurement, and mitigation of interference from a mobile unit that may be situated in the boundary region between its own home base station and an incumbent base station. The process begins at block 1501 when a home base station receives notification that an incumbent system/service may be receiving interference from a mobile unit member of the home base station's system/service which is essentially stationary and operating in a boundary between its own home base station and that of an incumbent base station. The mobile interference report is typically preceded by a Blank Burst test of the home base station's emissions as sampled by the incumbent receiver. If the Blank Burst test is negative, a Mobile Reverse Blank Burst test may be conducted based on a probability that the interference may be from a fixed mobile unit. In any case, the mobile unit requests a Blank Burst from the home base station at block 1502.

During the burst, the difference between pre- and post-Blank Burst signal strength is measured in block 1503. If the signal during the Blank Burst interval is comparable, within a predetermined margin, to the signal from the home base station before and after the Blank Burst, it is assumed that the reciprocal nature of the signal during the Burst may indicate the potential for interference at the incumbent receiver. If the signal decision at block 1504 indicates that the levels are not comparable, the process terminates. If there is sufficient signal to warrant continuation of the process, the process advances to block 1506, where the mobile application requests that the home base station identify the incumbent base station most likely to experience interference due to its proximity to the mobile's geographical location.

The home base station schedules a Reverse Blank Burst at block 1507 with the incumbent base station and confirms the Burst with the mobile. At the scheduled time, the mobile transmits the Reverse Blank Burst at block 1508. The incumbent receiver will have recorded the signal strength during the pre- and post-Reverse Blank Burst as well as during the Burst itself. It has also sent the signal level to the home base station at 1509 which is hence sent to the mobile. If the signal at the incumbent receiver during the Reverse Blank Burst at decision block 1510 is large enough to constitute meaningful interference, the process continues at Block 1511. Otherwise, the process terminates at Block 1510.

At block 1511, the application in the mobile unit checks whether the home base station has sent a modified (reduced) power setting to the mobile unit through its native power control function (if it exists). If so, the process terminates. If "no" at block 1511, block 1512 sets the power level of the mobile's transmitter autonomously and stores it. In block 1513 the application notifies the home base station that the power level has been set autonomously. If the mobile unit's geographical location changes (e.g. the mobile changes from fixed operation to a new location), the process flow moves to Block 1502 to restart the Reverse Blank Burst process. This ensures that the mobile's new location does not result in a return of interference to the incumbent base station. If the location of the mobile unit has not changed, the process continues in the loop formed by blocks 1514 and 1513 to ensure that the power level of the transmitter is maintained at the lower level to reduce interference.

What is claimed is:

1. A method of resolving co-channel interference for a plurality of spectrum sharing wireless communication systems configured to communicate with a distributed spectrum interference management system, wherein the plurality of spectrum sharing wireless communication systems includes at least one interference initiator and an interference victim, the method comprising the steps of:

receiving, by a master policy management controller, an interference assessment request from a local policy management controller in communication with the interference victim, wherein the master policy management controller is configured to be in communication with the distributed spectrum interference management system and a master database;

initiating, by the master policy management controller upon receiving the interference assessment request, launch of a data collection application to collect interference data from a plurality of memories each containing a local spectrum management database associated with respective ones of the plurality of spectrum sharing wireless communication systems;

storing, within the master database, the interference data collected from the plurality of spectrum sharing wireless communication systems, wherein the master database is configured to be in communication with the distributed spectrum interference management system;

ranking, by the master policy management controller, the plurality of spectrum sharing wireless communication systems based on the interference data collected from the plurality of spectrum sharing wireless communication systems and based upon a predetermined policy to generate a list of potential interference initiators;

repeating a comparison of the interference data collected from the plurality of spectrum sharing wireless communication systems with the interference assessment request until the interference initiator is identified; and transferring control, by the master policy management controller in response to identification of the interference initiator, of resolution of the co-channel interference to the local policy management controller in communication with the interference victim, wherein transferring control to the local policy management controller comprises transferring control of execution of a blank burst application program from the master policy management controller to the local policy management controller and wherein the blank burst application controls the resolution of the co-channel interference between the interference victim and the interference initiator.

2. The method of claim 1, wherein the blank burst application program comprises a Distributed Spectrum Interference Management System (DSIMS) for controlling the resolution of the co-channel interference between the interference victim and the interference initiator.

3. The method of claim 2, wherein the DSIMS comprises a Blank Burst Candidate Interference operation for controlling the resolution of the co-channel interference between the interference victim and the interference initiator.

4. The method of claim 2, wherein the DSIMS comprises a Reverse Blank Burst Interference operation for controlling the resolution of the co-channel interference between the interference victim and the interference initiator.

5. The method of claim 2, wherein the DSIMS comprises a Reverse Blank Burst Mobile Unit Candidate Interference operation for controlling the resolution of the co-channel interference between the interference victim and the interference initiator.

* * * * *